US012531761B2

(12) United States Patent
Crites et al.

(10) Patent No.: US 12,531,761 B2
(45) Date of Patent: Jan. 20, 2026

(54) TIME-DEPENDENT PROGRESSIVE DISCLOSURE OF INFORMATION

(71) Applicant: RESIDEO LLC, Golden Valley, MN (US)

(72) Inventors: Michael Crites, Minneapolis, MN (US); Christopher R. Jones, Minneapolis, MN (US)

(73) Assignee: RESIDEO LLC, Golden Valley, MN (US)

( * ) Notice: Subject to any disclaimer, the term of this patent is extended or adjusted under 35 U.S.C. 154(b) by 435 days.

(21) Appl. No.: 17/756,763

(22) PCT Filed: Dec. 3, 2020

(86) PCT No.: PCT/US2020/063132
§ 371 (c)(1),
(2) Date: Jun. 1, 2022

(87) PCT Pub. No.: WO2021/113526
PCT Pub. Date: Jun. 10, 2021

(65) Prior Publication Data
US 2023/0006858 A1 Jan. 5, 2023

Related U.S. Application Data

(60) Provisional application No. 62/943,727, filed on Dec. 4, 2019.

(51) Int. Cl.
*H04L 12/28* (2006.01)
*F24F 11/52* (2018.01)
(Continued)

(52) U.S. Cl.
CPC .......... *H04L 12/2816* (2013.01); *F24F 11/52* (2018.01); *F24F 11/65* (2018.01);
(Continued)

(58) Field of Classification Search
None
See application file for complete search history.

(56) References Cited

U.S. PATENT DOCUMENTS

2007/0241203 A1 10/2007 Wagner et al.
2012/0242705 A1 9/2012 Wu
(Continued)

FOREIGN PATENT DOCUMENTS

CN 107690028 A 2/2018

OTHER PUBLICATIONS

International Search Report and Written Opinion of International Application No. PCT/US2020/063132, mailed Mar. 23, 2021, 13 pp.

*Primary Examiner* — Ryan A Jarrett
(74) *Attorney, Agent, or Firm* — Greenberg Traurig, LLP; Ryan D. Sharp; David J. Dykeman

(57) ABSTRACT

A controller device for a heating, ventilation, and air conditioning (HVAC) system may output, while in a first state, a first user interface for display at a display device, where the first user interface includes first information at a first output size. The controller device may determine, while in the first state and based at least in part on whether an elapsed time since a most recent indication of user input received at a user input device exceeds a timeout period, that no users are physically proximate to the controller device. The controller device may, in response: transition the controller device from the first state to a second state and output a second user interface at the display device, where the second user interface comprises second information at a second output size that is larger than the first output size.

20 Claims, 10 Drawing Sheets

(51) Int. Cl.
*F24F 11/65* (2018.01)
*F24F 110/10* (2018.01)
*F24F 110/20* (2018.01)

(52) U.S. Cl.
CPC ......... H04L 12/283 (2013.01); *F24F 2110/10* (2018.01); *F24F 2110/20* (2018.01); *H04L 2012/2847* (2013.01)

(56) References Cited

U.S. PATENT DOCUMENTS

| | | |
|---|---|---|
| 2015/0204563 A1 | 7/2015 | Imes et al. |
| 2017/0074539 A1 | 3/2017 | Bentz et al. |
| 2017/0075555 A1* | 3/2017 | Xu .......................... F24F 11/30 |
| 2017/0234562 A1 | 8/2017 | Ribbich et al. |
| 2019/0024919 A1* | 1/2019 | Trivedi ................. G06F 3/0488 |

\* cited by examiner

TIME-DEPENDENT PROGRESSIVE DISCLOSURE OF INFORMATION

This application is a national stage entry of WO International Patent Application No. PCT/US2020/063132, filed 3 Dec. 2020, which claims the benefit of U.S. Provisional Patent Application No. 62/943,727, filed 4 Dec. 2019, the entire content of both being incorporated herein by reference.

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors.

SUMMARY

In general, this disclosure relates to a controller for controlling a heating, ventilation, and air conditioning (HVAC) system. The controller for an HVAC system may be a thermostat or any other suitable hardware device for controlling and monitoring the operations of the HVAC system. The controller may include user interface devices for receiving user input and for displaying information regarding the HVAC system or information regarding environmental conditions as determined by the HVAC system.

The controller may be able to determine whether users of the controller are physical proximate to the controller and may adjust the visual presentation of the information based on its determination of whether users of the controller are physical proximate to the controller. When the controller determines that no users are physically proximate to the controller, the controller may change its visual presentation of information displayed at the display of the controller to increase the legibility of information displayed at the display of the controller for users that are not physically proximate the controller. For example, the controller may increase the text size of the information displayed at the display.

The controller may be able to determine whether users of the controller are physical proximate to the controller without the use of a proximity sensor or other similar sensors. Instead, the controller may determine an elapsed time since the most recent user interaction with the controller. If the controller determines that the elapsed time since the most recent user interaction with the controller reaches or exceeds a specified timeout period, the controller may correspondingly determine that no users are physically proximate to the controller, and may accordingly change its visual presentation of information displayed at the display of the controller to increase the legibility of information displayed at the display of the controller for users that are not physically proximate the controller, such as by increasing the text size of the information displayed at the display.

In one example, the disclosure is directed to a method for controlling a heating, ventilation, and air conditioning (HVAC) system for a building. The method includes outputting, by a controller of a HVAC system for a building, while the controller is in a first state, a first user interface for display at a display device of the controller, wherein the first user interface comprises first information that is displayed by the display device at a first output size. The method further includes determining, by the controller without use of a proximity sensor while the controller is in the first state and based at least in part on whether an elapsed time since a most recent indication of user input received at a user input device of the controller exceeds a timeout period, that no users are physically proximate to the controller. The method further includes in response to determining that no users are physically proximate to the controller: transitioning the controller from the first state to a second state, and outputting, by the controller, a second user interface at the display device of the controller, wherein the second user interface comprises second information that is displayed by the display device at a second output size that is larger than the first output size.

In another example, the disclosure is directed to a controller device for a heating, ventilation, and air conditioning (HVAC) system in a building. The controller device includes a display device. The controller device further includes processing circuitry configured to: output, while the controller device is in a first state, a first user interface for display at the display device, wherein the first user interface comprises first information at a first output size; determine, while the controller device is in the first state and based at least in part on whether an elapsed time since a most recent indication of user input received at a user input device of the controller device exceeds a timeout period, that no users are physically proximate to the controller device; and in response to determining that no users are physically proximate to the controller device: transition the controller device from the first state to a second state, and output a second user interface at the display device of the controller, wherein the second user interface comprises second information at a second output size that is larger than the first output size.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
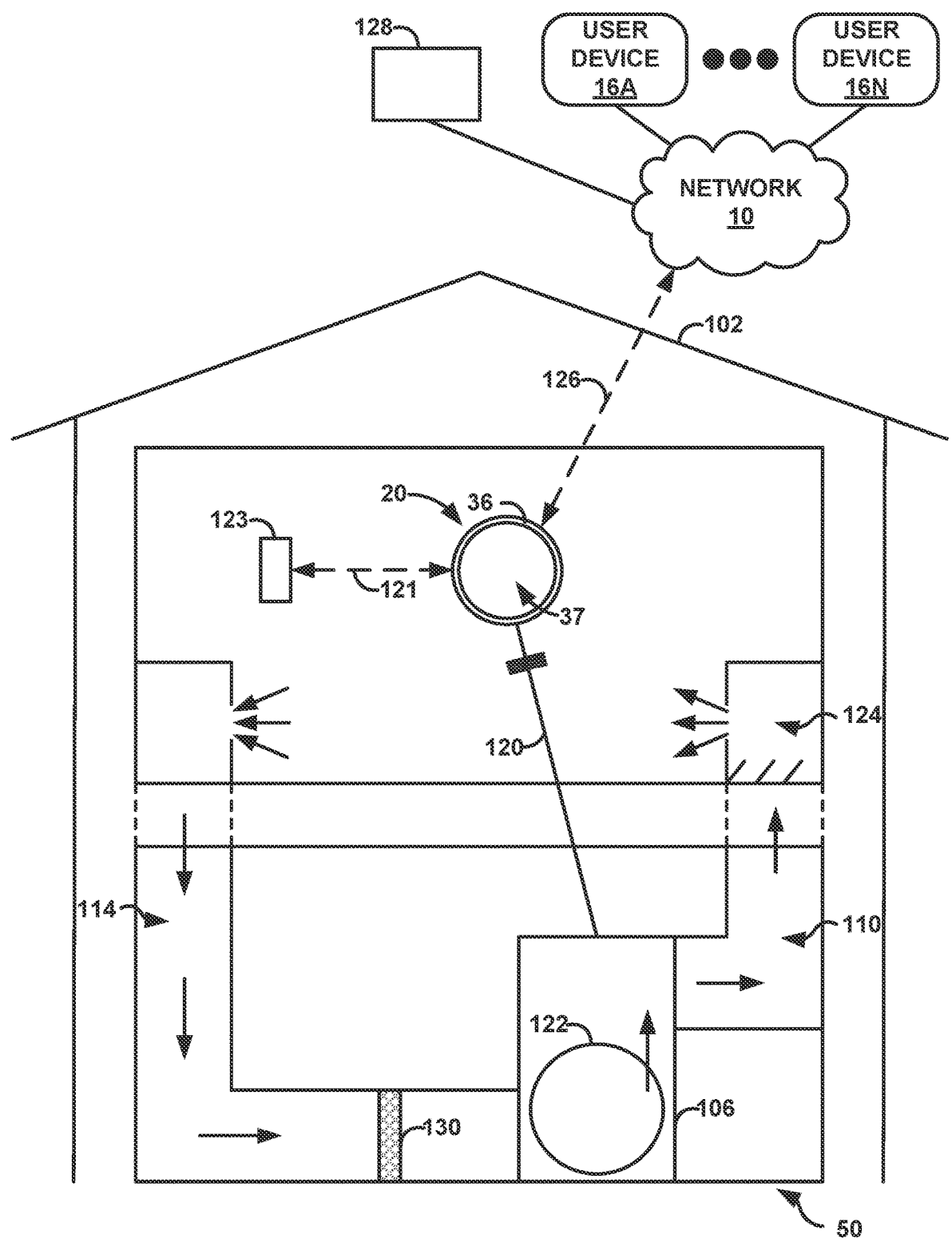
FIG. 1 is a block diagram illustrating an example heating, ventilation, and air conditioning (HVAC) system in a building, in accordance with one or more techniques described herein.

In general, this disclosure relates to adjusting the presentation of information displayed by a controller for controlling a heating, ventilation, and air conditioning (HVAC) system based on the proximity of users to the controller. The controller of a HVAC system, such as a thermostat, a smart thermostat, or any other hardware device for controlling and/or monitoring the HVAC system may include a display that displays any of a variety of information that the controller may receive from any suitable sources, such as via sensors of the HVAC system of a building, through a network (e.g., the Internet), and the like. For example, the controller may display information regarding the air temperature, energy usage, water usage, home security system status, and the like that are associated with the environment of the HVAC system, such the building for which the HVAC system controls the internal climate conditions.

A controller typically includes a display that is relatively small in size, such as a rectangular display that is less than 4 inches on the diagonal or a circular display that has a diameter of less than 4 inches. As such, human perception limitations may potentially require a user to be physically proximate (e.g., within about three feet or less) to the controller in order for the information displayed by the display of the controller to be legible to the user.

Certain American National Standards Institute (ANSI) standards recommend 20-22 minutes of a visual angle subtended on the retina of a user viewing a display in order for the user to be able to legibly read information displayed by the display of a controller. However, if a user is not physically proximate to the display of a controller, a small display, such as described above, of a controller may subtend a visual angle of only 6 minutes to a user that is 10 feet away from the display.

A controller for controlling a HVAC system may typically be mounted to a wall of a building. In order for a user to physically interact with the controller in order to, for example, control the HVAC system, such as adjusting the heating or air conditioning functions of the HVAC system in order to increase or decrease the ambient temperature of the building, the user may move himself or herself, such as by walking towards the controller, so that the user is physically proximate the controller.

While the user is physically proximate to the controller and physically interacting with the controller, the controller may output information for display at the display of the controller that is legible to the user. Because the user is physically proximate to the controller (e.g., about three feet or less away from the controller), the information displayed at the display of the controller may be designed to be legible to the physically proximate user. For example, the information displayed by the display may be relatively dense (e.g., there may be a relatively large amount of information displayed at the display) and may be displayed at a relatively small font size (e.g., 12 point, 14 points, 18 points, and the like).

Once the user has finished its interactions with the physical controls of the controller, the user may move (e.g., walk) away from the controller so that the user is no longer physically proximate to (e.g., within three feet of) the controller. However, the information displayed by the display that is legible to the physically proximate user may no longer be legible to the user when the user is no longer physically proximate to the controller.

To overcome such potential issues for a controller to display information that is legible to a user that is not physically proximate to the controller, the controller may dynamically change the visual appearance of the information displayed by the display of the controller based on the viewing distance of the user that is independent of user intervention. That is, the controller may dynamically change the visual appearance of the information displayed by the display of the controller without receiving explicit user input at the user input devices of the controller in order to cause the controller to change the visual appearance of the information displayed by the display. To change the visual appearance of the information displayed by the display, the controller may increase the size of the information displayed by the display (e.g., increase the font size of the information displayed by the display), increase the contrast of information displayed by the display, animate the information displayed by the display, reduce the information density of the information displayed by the display (e.g., display fewer pieces of information) or otherwise alter the visual appearance of the information displayed by the display to increase the legibility of such information to a user that is not physically proximate to the controller.

To that end, in some examples, a controller may include a proximity sensor, such as a passive infrared sensor, an ultrasonic sensor, a motion sensor, cameras and the like, that is able to detect the presence of nearby objects without any physical contact, that the controller may use to detect whether any users are physically proximate the controller. For example, a controller may use a proximity sensor to determine whether any users are physically proximate of the sensor or to otherwise determine the physical distance of users from the controller. A controller may therefore use a proximity sensor to determine the distance of users from the controller in order to determine whether to alter the visual appearance of the information displayed by the display of controller to increase the legibility of such information to users that are not physically proximate to the controller.

While some controllers of HVAC systems may include proximity sensors, other controllers of HVAC systems may not include proximity sensors. For example, inclusion of a proximity sensor may add to the costs of a controller and may prevent a controller for an HVAC system from meeting a certain price point. Thus, it may potentially be desirable for such controllers without proximity sensors to still be able to determine that users are not physically proximate to the controllers, so that such controllers can dynamically alter the visual appearance of the information displayed by the display, in order to increase the legibility of the information displayed by the display of the controllers for users that are not physically proximate to the controllers.

In accordance with aspects of the present disclosure, a controller of an HVAC system may be able to determine when no users are physically proximate to the controller without use of a proximity sensor. Instead, the controller may determine whether the elapsed time after the most recent user interaction with the controller reaches or exceeds a specified timeout period, such as 15 seconds, 30 seconds, 45 seconds, and the like. The most recent user interaction with the controller may be a most recent physical interaction with the physical controller, such as a physical interaction via a button, dial, a touch-sensitive input device, or other physical components of the controller. This is opposed to user interaction with the controller via, e.g., use of a mobile computing device (e.g., a smart phone) that communicates with the controller over a network, such as the Internet, an intranet, Bluetooth, Wi-Fi, and the like, that may not require physical interaction with the controller. When the elapsed time after the most recent user interaction with the controller reaches or exceeds a specified timeout period, the controller may determine that no users are physically proximate to the controller.

When the elapsed time after the most recent user interaction with the controller reaches or exceeds a specified timeout period, the controller may determine that no users are physically proximate to the controller. Accordingly, the controller may correspondingly dynamically change the appearance of the information displayed by the display, such as by increasing the size of the information displayed by the display, increasing the contrast of the information displayed by the display, or otherwise visually emphasizing the information displayed by the display, to increase the legibility of information displayed by the display of the controller to users that are across the room from the controller or are otherwise are not physically proximate to the controller.

As such, aspects of the present disclosure describe a controller of an HVAC system that is able to determine whether users are physically proximate to the controller without use of any proximity sensors. Such a controller may be able to provide capabilities similar to that of controllers that contain proximity sensors at a lower price and with fewer hardware components, thereby fulfilling general usability and accessibility needs within the constraints of pricing and hardware restrictions. By utilizing a time-based technique as opposed to a proximity sensing technique to determine whether users are physically proximate to the controller, the techniques described herein enables a controller of an HVAC system to progressively disclose legible information across a variety of user types and abilities.

FIG. 1 is a block diagram illustrating an example HVAC system 50 in a building 102, in accordance with one or more techniques described herein. HVAC system 50 includes HVAC component 106, a system of ductwork and air vents including supply air duct 110 and a return air duct 114, and HVAC controller 20. HVAC component 106 may include, but is not limited to, a furnace, a heat pump, an electric heat pump, a geothermal heat pump, an electric heating unit, an air conditioning (AC) unit, a humidifier, a dehumidifier, an air exchanger, an air cleaner, a damper, a valve, a fan, and/or the like.

HVAC controller 20 is an HVAC controller that may be configured to control the comfort level (e.g., temperature and/or humidity) in building 102 by activating and deactivating HVAC component 106 in a controlled manner. HVAC controller 20 may be configured to control HVAC component 106 via a wired or wireless communication link 120. In an example wired communication link 120 to HVAC component 106, HVAC controller 20 may connect to a plurality of wires (e.g., see FIGS. 2A-2D). HVAC controller 20 may be a thermostat, such as, for example, a wall mountable thermostat, or any other hardware device that is configured to control the operations of HVAC system 50. In some examples, HVAC controller 20 may be programmable to allow for user-defined temperature set points to control the temperature of building 102. Based on sensed temperature of building 102, HVAC controller 20 may turn on or off HVAC component 106 to reach the user-defined temperature set point. Although this disclosure describes HVAC controller 20 (and controllers shown in other figures) as controlling HVAC component 106 and determining whether an actual configuration includes an irregularity, external computing device 123 may also be configured to perform these functions.

HVAC component 106 may provide heated air (and/or cooled air) via the ductwork throughout the building 102. As illustrated, HVAC component 106 may be in fluid communication with every space, room, and/or zone in building 102 via supply air duct 110 and 114, but this is not required. In operation, when HVAC controller 20 provides a heat call signal, HVAC component 106 (e.g. a forced warm air furnace) may turn on (begin operating or activate) to supply heated air to one or more spaces within building 102 via supply air ducts 110. HVAC component 106 and blower or fan 122 can force the heated air through supply air duct 110. In this example, cooler air from each space returns to HVAC component 106 (e.g. forced warm air furnace) for heating via return air ducts 114. Similarly, when a cool call signal is provided by HVAC controller 20, HVAC component 106 (e.g., an AC unit) may turn on to supply cooled air to one or more spaces within building 102 via supply air ducts 110. HVAC component 106 and blower or fan 122 can force the cooled air through supply air duct 110. In this example, warmer air from each space of building 102 may return to HVAC component 106 for cooling via return air ducts 114.

The system of vents or supply air duct 110 and/or 114 can include one or more dampers 124 to regulate the flow of air, but this is not required. For example, one or more dampers 124 may be coupled to HVAC controller 20, and can be coordinated with the operation of HVAC component 106. HVAC controller 20 may actuate dampers 124 to an open position, a closed position, and/or a partially open position to modulate the flow of air from the one or more HVAC components to an appropriate room and/or space in building 102. Dampers 124 may be particularly useful in zoned HVAC systems, and may be used to control which space(s) in building 102 receive conditioned air and/or receives how much conditioned air from HVAC component 106.

In many instances, air filters 130 may be used to remove dust and other pollutants from the air inside building 102. In the example shown in FIG. 1, air filter 130 is installed in return air duct 114 and may filter the air prior to the air entering HVAC component 106, but it is contemplated that any other suitable location for air filter 130 may be used. The presence of air filter 130 may not only improve the indoor air quality but may also protect the HVAC component 106 from dust and other particulate matter that would otherwise be permitted to enter HVAC component 106.

HVAC controller 20 may include any suitable arrangement of hardware, software, firmware, or any combination thereof, to perform the techniques attributed to HVAC controller 20 herein. Examples of HVAC controller 20 include any one or more microprocessors, digital signal processors (DSPs), application specific integrated circuits (ASICs), field programmable gate arrays (FPGAs), or any other equivalent integrated or discrete logic circuitry, as well as any combinations of such components. When HVAC controller 20 includes software or firmware, HVAC controller 20 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Although not shown in FIG. 1, HVAC controller 20 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to HVAC controller 20 (e.g., may be external to a package in which HVAC controller 20 is housed). For example, HVAC controller 20 may be able to store data to and read data from the memory included in external computing device 123 and/or the memory included in external database 128. The memory may be used for storing data such as possible wiring configurations of HVAC controller 20 and network settings such as an Internet Protocol (IP) address and/or a Media Access Control (MAC) address of HVAC controller 20, external computing device 123, and/or a router.

HVAC controller 20 may include any number of wire terminals which make up a terminal block (e.g., a wall plate or a terminal plate) for receiving a plurality of control wires for one or more HVAC components 106 of HVAC system 50. The memory may store possible wiring configurations for HVAC components 106, enabling HVAC controller 20 to determine what HVAC components 106 are connected. The memory of HVAC controller 20 may also store settings for HVAC system 50 which correspond to the possible wirings configurations for HVAC components 106. For example, if HVAC controller 20 is wired to HVAC component 106 which includes an AC unit, HVAC controller 20 may determine settings to allow for cool call signals to control turning on and off of the AC unit.

In some examples, HVAC controller 20 may also include a memory for storing data about how previous HVAC controllers have been configured. For example, the memory may store an expected wiring configuration associated with a certain geographic location. In some examples, the memory may store program instructions, which may include one or more program modules, which are executable by HVAC controller 20. When executed by HVAC controller 20, such program instructions may cause HVAC controller 20 to provide the functionality ascribed to it herein. The program instructions may be embodied in software, firmware, and/or RAMware.

In some examples, HVAC controller 20 may include one or more physical controls, such as buttons, dials, touch-sensitive input device, and the like, with which users may physically interact in order to interact with HVAC controller 20 to control HVAC system 50. For example, HVAC controller 20 may include a dial 36 which is located at an outer circumference of HVAC controller 20. HVAC controller 20 may be fixed to a wall or another surface such that dial 36 may be rotated relative to one or more other components (e.g., display 37) of HVAC controller 20. Dial 36 may represent a user interface such that processing circuitry of HVAC controller 20 may receive, via dial 36, information indicative of a user input. In some examples, the user input may represent a user selection of a set point parameter value (e.g., a set point temperature), a user selection of information to be displayed by HVAC controller 20, or a user selection of another setting. Dial 36 may include a set of light-emitting diodes (LEDs). The processing circuitry of HVAC controller 20 may selectively illuminate one or more LEDs of the set of LEDs in order to indicate a set point temperature or convey other information. In some examples, dial 36 may smoothly rotate with respect to display 37. In some examples, dial 36 may rotate with one or more steps such that as dial 36 rotates, dial 36 "snaps" into position after every interval of rotational distance. In some examples, dial 36 may smoothly rotate with respect to display 37 and HVAC controller 20 may output an audio signal (e.g., a clicking noise) for every interval of rotational position (e.g., every one degree) in which dial 36 rotates.

Display 37 may include information relating to one or more aspects of an area in which HVAC controller 20 is located (e.g., a room in which HVAC controller 20 is located, a building in which HVAC controller 20 is located, an area outside of a building in which HVAC controller 20 is located, or any combination thereof). In some examples, at least a portion of display 37 may include a digital display which may permit HVAC controller 20 to display information and/or accept one or more user inputs to HVAC controller 20. In some examples, HVAC controller 20 includes the digital display in combination with an analog display. In at least some examples where display 37 includes a digital display, display 37 may include a user interface which may permit a user to input various operating parameters (e.g., temperature set points, humidity set points, fan set points, starting times, ending times, schedule times, diagnostic limits, configuration settings, responses to alerts, and the like) to HVAC controller 20. In some examples, the display may be a physical user interface that is accessible at HVAC controller 20 and may include a display and/or a distinct keypad. Display 37 may include any suitable display. In some examples, display 37 may include, or may be, a liquid crystal display (LCD), and in some cases an e-ink display, fixed segment display, or a dot matrix LCD display. The distinct keypad may include a numerical keypad, system of buttons, control knob, and the like. Additionally or alternatively, HVAC controller 20 can display information and/or accept user inputs via the user interface of external computing device 123. Thus, a user can interact with HVAC controller 20 through a mobile phone, a tablet, or a computer. For example, user devices 16A-16N (collectively, "user devices 16") may communicate with HVAC controller 20 via network 10.

In some examples, display 37 may include a touch-sensitive input device to detect user inputs to HVAC controller 20. Example touch-sensitive input devices include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Display 37 of HVAC controller 20 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user. The user interface presented by the display of HVAC controller 20 may allow a user to program settings of HVAC controller 20, set temperature zones for building 102, configure desired temperatures for building 102 for different times of the day or days of the week, or other operating parameters. Display 37 of HVAC controller 20 may also be used to present user queries (e.g., what room HVAC controller 20 is installed in, what the address of building 102 is, what HVAC components 106 are connected to HVAC controller 20, etc.). Such queries may aid in installing and/or configuring HVAC controller 20 (e.g. when first connecting HVAC controller 20 to HVAC component 106 of HVAC system 50).

In some examples, display 37 may be configured to display any one of a set of screens, wherein each screen of the set of screens is related to a specific one or more parameters or one or more topics corresponding to the building in which HVAC controller is placed. For example, the set of screens may include a time and outdoor temperature screen, an inside temperature screen, an air quality screen, a water usage screen, an energy usage screen, and a security screen. In some examples, the processing circuitry of HVAC controller 20 may receive a signal indicative of a user selection of a screen of the set of screens for display by HVAC controller 20. For example, HVAC controller 20 may allow the set of screens to be scrolled across display 37.

HVAC controller 20 may include a communication device (not illustrated in FIG. 1) to allow HVAC controller 20 to communicate via a wired or wireless connection 121 to one or more external computing devices 123. The communication device may include a Bluetooth transmitter and receiver, a Wi-Fi transmitter and receiver, a Zigbee transceiver, a near-field communication transceiver, or other circuitry configured to allow HVAC controller 20 to communicate with external computing device 123. In some examples, the communication device may allow HVAC controller 20 to exchange data with external computing device 123. Examples of exchanged data include a desired temperature for building 102, HVAC components 106 connected to HVAC controller 20, error codes, geographic location, estimated energy usage and cost, and/or other operating parameters or system performance characteristics for HVAC system 50.

HVAC controller 20 may communicate via wired or wireless connection 121 with external computing device 123. External computing device 123 may be, include, or otherwise be used in combination with a mobile phone, smartphone, tablet computer, personal computer, desktop computer, personal digital assistant, router, modem, remote server or cloud computing device, and/or related device allowing HVAC controller 20 to communicate over a communication network such as, for example, the Internet or other wired or wireless connection. Communicating via the wired or wireless connection 121 may allow HVAC controller 20 to be configured, controlled, or otherwise exchange data with external computing device 123. In some examples, HVAC controller 20 communicating via wired or wireless connection 121 may allow a user to set up HVAC controller 20 when first installing the controller in building 102. In some examples, HVAC controller 20 and external computing device 123 communicate through a wireless network device such as a router or a switch. In other examples, HVAC controller 20 and external computing device 123 communicate through a wired connection such as an ethernet port, USB connection, or other wired communication network.

HVAC controller 20 may, via the communication device, communicate via a wired or wireless connection 126 with external database 128. In some examples, wired or wireless connection 126 enables HVAC controller 20 to communicate with external database 128 via a wireless connection which includes a network device such as a router, ethernet port, or switch. HVAC controller 20 and external database 128 may also communicate through a wired connection such as an ethernet port, USB connection, or other wired communication network. Communicating via the wired or wireless connection 126 may allow HVAC controller 20 to exchange data with external database 128. As such, external database 128 may be at a location outside of building 102. In some examples, external database 128 may be, include, or otherwise be used in combination with a remote server, cloud computing device, or network of controllers configured to communicate with each other. For example, HVAC controller 20 may check with HVAC controllers in nearby buildings through the internet or other city- or wide-area network. HVAC controller 20 may include the onboard database because it is unable to communicate via the communication device.

In some examples, external database 128 may be, or otherwise be included in, or accessed via, external computing device 123 (e.g., smartphone, mobile phone, tablet computer, personal computer, etc.). For example, HVAC controller 20 may communicate via a Wi-Fi network connection with a smartphone device to exchange data with external database 128. By communicating via wired or wireless connection 126, HVAC controller 20 may exchange data with external database 128.

In accordance with aspects of the present disclosure, HVAC controller 20 may be configured to determine whether any users are physically proximate to HVAC controller 20, and may be configured to output, for display at display 37, different user interfaces depending on whether HVAC controller 20 has determined that any users are physically proximate to HVAC controller 20. As described above, because display 37 of HVAC controller 20 may, in some examples, be relatively small in size, such as being a rectangular display that is less than 4 inches on the diagonal or being a circular display that has a diameter of less than 4 inches, human perception limitations may potentially require a user to be physically proximate (e.g., within about three feet or less) to HVAC controller 20 in order for the information displayed by display 37 of HVAC controller 20 to be legible to the user. As such, when HVAC controller 20 determines that at least one user is physically proximate to HVAC controller 20, display 37 may display a first user interface that is designed for viewing by users that are physically proximate to HVAC controller 20. Conversely, when HVAC controller 20 determines that no users are physically proximate to HVAC controller 20, display 37 may display a second user interface that is designed for viewing by users that are not physically proximate to HVAC controller 20.

In some examples, a user may be physically proximate to HVAC controller 20 if the user is within three feet of HVAC controller 20. In some other examples, a user may be physically proximate to HVAC controller 20 if the user is within two feet of HVAC controller 20, or if the user is within four feet of HVAC controller 20. HVAC controller 20 may be configured to determine whether any users are physically proximate to HVAC controller 20 without the use of any proximity sensors, such as such as a passive infrared sensor, an ultrasonic sensor, a motion sensor, cameras, or any other sensors that are used to detect the proximity of nearby objects. Instead, HVAC controller 20 may be configured to use a time-based technique to determine whether any users are physically proximate to HVAC controller 20.

To determine whether any users are physically proximate to HVAC controller 20 without the use of any proximity sensors, HVAC controller 20 may instead determine whether any users are physically proximate to HVAC controller 20 based on an elapsed time since a most recent indication of user input received at a user input device of HVAC controller 20. A user input device of HVAC controller 20 may be physical controls of HVAC controller 20, such as buttons, dials (e.g., dial 36), touch-sensitive input devices (e.g., display 37), or other physical components of HVAC controller 20 with which a user may physically interact with, such as by pressing, turning, swiping, touching, and the like in order to provide input for HVAC controller 20. The physical controls may be on the physical body of HVAC controller 20, such that such physical controls may be operable only by users that are physically proximate to HVAC controller 20. This is opposed to physical controls of a mobile phone, a tablet, a remote control, or other devices, such as user devices 16, which may remotely communicate with HVAC controller 20 via network 10 even when such devices are not within the physical proximity of HVAC controller 20.

Because a user is within physical proximity of HVAC controller 20 in order to physically interact with a user input device of HVAC controller 20 to provide user input, HVAC controller 20 may associate user interaction with HVAC controller 20 with at least one user being physically proximate to HVAC controller 20. As such, HVAC controller 20 may be configured to determine that at least one user is physically proximate to HVAC controller 20 in response to receiving an indication of user interaction with HVAC controller 20. For example, receiving the indication of user interaction with HVAC controller 20 may include receiving an indication of user input at a user input device of HVAC controller 20.

HVAC controller 20 may be configured to keep track of the elapsed time since the most recent user interaction with HVAC controller 20. As such, once HVAC controller 20 receives an indication of user input at a user input device of HVAC controller 20, HVAC controller 20 may keep track the elapsed time since receiving the indication user input, and may reset the elapsed time to zero each time HVAC controller 20 receives a subsequent indication of user input at a user input device of HVAC controller 20.

In some examples, HVAC controller 20 may be configured to determine whether an elapsed time since a most recent indication of user input received at a user input device of HVAC controller 20 exceeds a timeout period. Examples of a timeout period may be 15 seconds, 30 seconds, 45 seconds, and the like. In some examples, the timeout period may be determined based on an average amount of time that is spent by a user in physically proximity to HVAC controller 20 after interacting with HVAC controller 20. In some examples, the timeout period may differ depending on the time of the day, the day of the year, the indoor and/or outdoor temperature, and the like. In some examples, the timeout period may differ depending on the functionality of HVAC controller 20 that was accessed by the most recent user input received at a user input device, so that, for example, the timeout period after receiving user input for adjusting the temperature setpoint of HVAC system 50 for building 102 may differ from the timeout period after receiving user input for turning on or off a fan (e.g., fan 122) of HVAC system 50.

If HVAC controller 20 determines that the elapsed time since the most recent indication of user input received at a user input device of HVAC controller 20 has yet to exceed the timeout period, HVAC controller 20 may determine that at least one user is physically proximate HVAC controller 20. Conversely, if HVAC controller 20 determines that the elapsed time since the most recent indication of user input received at a user input device of HVAC controller 20 exceeds the timeout period, HVAC controller 20 may determine that no users are physically proximate to HVAC controller 20.

HVAC controller 20 may have states that are associated with whether HVAC controller 20 determines that any users are physically proximate to HVAC controller 20, and HVAC controller 20 may transition between different states based on changes in HVAC controller 20's determination that any users are physically proximate to HVAC controller 20. For example, HVAC controller 20 may be in an active state associated with HVAC controller 20 determining that a user is physically proximate to HVAC controller 20, HVAC controller. HVAC controller 20 may also be in an idle state associated with HVAC controller 20 determining that no users are physically proximate to HVAC controller 20.

While HVAC controller 20 is in an active state, if HVAC controller 20 determines that no users are physically proximate to HVAC controller 20, such as by determining that the elapsed time since the most recent indication of user input received at a user input device of HVAC controller 20 exceeds the timeout period, HVAC controller 20 may transition from the active state to an idle state. Conversely, while HVAC controller 20 is in the idle state, if HVAC controller 20 determines that a user is physically proximate to HVAC controller 20, HVAC controller 20 may transition from the idle state to the active state. The terms "idle" and "active" do not imply that the HVAC controller 20 shuts down or is otherwise inactive while in the idle state, nor do the terms imply that HVAC controller 20 is only actively operating when in the active state. Rather, the terms "idle" and "active" are simply used throughout this disclosure to differentiate between two different states of HVAC controller 20 in which HVAC controller 20 may output different user interfaces for display, as described below.

For example, HVAC controller 20 may output different user interfaces for display at display 37 based on the state of HVAC controller 20. In particular, display 37 may be configured to display, for each of the set of screens describe above, a first user interface while HVAC controller 20 is in the active state and a second user interface different from the first user interface while HVAC controller 20 is in the idle state. Because HVAC controller 20 is in the active state in response to determining that at least one user is physically proximate to HVAC controller 20, the first user interface displayed by display 37 while HVAC controller is in the active state may be designed for viewing by users that are physically proximate to HVAC controller 20. On the other hand, because HVAC controller 20 is in the idle state in response to determining that no users are physically proximate to HVAC controller 20, the second user interface displayed by display 37 while HVAC controller is in the idle state may be designed for viewing by users that are farther away (e.g., more than three feet away) from HVAC controller 20.

While HVAC controller 20 is in the active state, HVAC controller 20 may output a first user interface for display at display 37, where the first user interface includes information that is displayed by display 37 at a first output size. The information may include textual information, graphical information, video information, and the like that is related to HVAC system 50 and/or building 102. For example the information may relate to the indoor and/or outdoor ambient temperature of building 102, the temperature setpoint of HVAC system 50, the water usage of building 102, and the like. The first output size of the information may be the font size of the textual information, the size of the graphical information and/or video information, and the like.

As described above, HVAC controller 20 may transition the controller from the active state to the idle state in response to determining that no users are physically proximate to HVAC controller 20. Correspondingly, while HVAC controller 20 is in the idle state, HVAC controller 20 may output a second user interface for display at display 37, where the second user interface includes information. The information may include at least some of the same information in the first user interface outputted by HVAC controller 20 while in the first state, but may be displayed by display 37 at a second output size while HVAC controller 20 is in the second state.

Because HVAC controller 20 in the idle state is associated with HVAC controller 20 determining that no users are physically proximate to HVAC controller 20, the second user interface may be designed to be legible to users that are not physically proximate to HVAC controller 20 (e.g., are more than three feet away. Thus, the second output size of the information displayed by display 37 in the second user interface while HVAC controller 20 is in the idle state may be larger than the first output size of the information displayed by display 37 in the first user interface while HVAC controller 20 is in the active state. For example, in the case of textual information displayed by display 37, the second output size may represent a font size that is larger than the font size represented by the first output size.

HVAC controller 20 may, while in the idle state, determine that at least one user is physically proximate to HVAC controller 20 in response to receiving an indication of user input at a user input device of HVAC controller 20 determining that no users are physically proximate to HVAC controller 20. In response to determining that at least one user is physically proximate to HVAC controller 20, HVAC controller 20 may transition from the idle state back to the active state. As part of transitioning back to the active state, HVAC controller 20 may output the first user interface for display at display 37, where the first user interface includes the information that is displayed by display 37 at the first output size. In this way, display 37 may be able to change its presentation of displayed information based on whether any users are physically proximate to HVAC controller 20 in order to optimize its presentation of displayed information for the viewing distances of users of HVAC controller 20.

Figure 2:
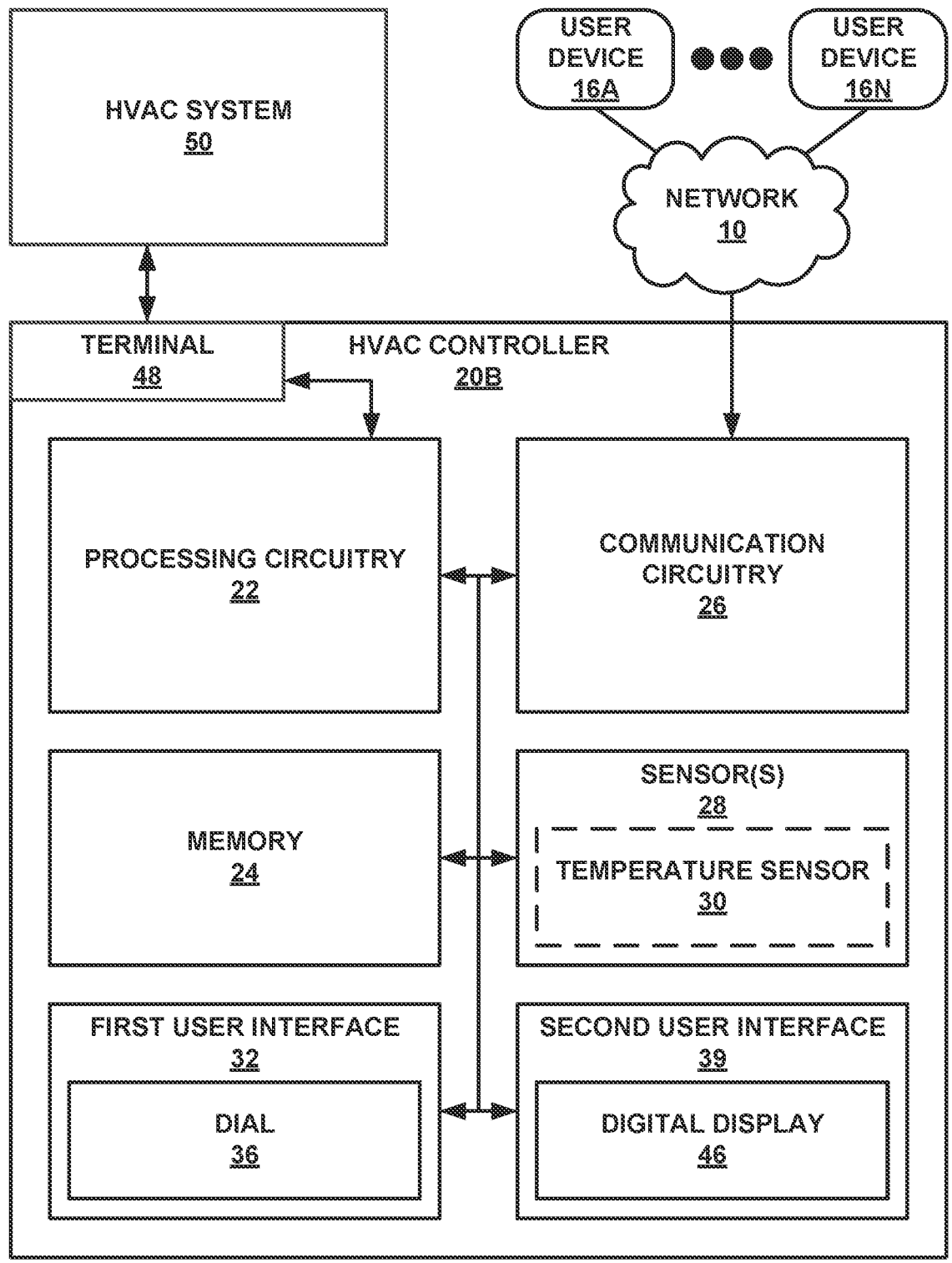
FIG. 2 is a block diagram illustrating an example HVAC controller including a digital display, in accordance with one or more techniques described herein.

FIG. 2 is a block diagram illustrating an example HVAC controller 20 including a dial 36 and a digital display 46, in accordance with one or more techniques described herein. As seen in FIG. 2, HVAC controller 20 includes processing circuitry 22, memory 24, communication circuitry 26, one or more sensors 28), first user interface 32, second user interface 39, and terminal 48. Sensors 28 may, in some examples, include a temperature sensor 30. First user interface 32 includes dial 36. Second user interface 39 includes a digital display 46. HVAC controller 20 may be configured to communicate with HVAC system 50 via terminal 48 and/or communicate with user devices 16A-16N (collectively, "user devices 16") via network 10. In some examples, HVAC controller 20 is an example of HVAC controller 20 of FIG. 1. In some examples, digital display 46 is an example of display 37 of FIG. 1.

HVAC controller 20 does not include any sensors, such as a passive infrared sensor or other proximity sensors, that is able to, without receiving explicit user interaction with HVAC controller 20, sense whether any users are physically proximate to HVAC controller 20. That is, while HVAC controller 20 may include user interface devices such as dial 36 and digital display 46 which may receive user input, such user interface devices may not be considered proximity sensors because such user input devices may receive explicit user interaction.

HVAC controller 20 may be configured to control HVAC system 50 in order to regulate one or more parameters of a space (e.g., a building, one or more rooms within a building, a large vehicle, or a vessel). In some examples, HVAC controller 20 regulates a temperature within the space. HVAC controller 20 may regulate the temperature of the space by using HVAC system 50 to decrease a temperature of the space if the current temperature of the space is greater than a first set point temperature and/or increase a temperature of the space using HVAC system 50 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 22 may include fixed function circuitry and/or programmable processing circuitry. Processing circuitry 22 may include any one or more of a microprocessor, a controller, a DSP, an ASIC, an FPGA, or equivalent discrete or analog logic circuitry. In some examples, processing circuitry 22 may include multiple components, such as any combination of one or more microprocessors, one or more controllers, one or more DSPs, one or more ASICs, or one or more FPGAs, as well as other discrete or integrated logic circuitry. The functions attributed to processing circuitry 22 herein may be embodied as software, firmware, hardware or any combination thereof.

In some examples, memory 24 includes computer-readable instructions that, when executed by processing circuitry 22, cause HVAC controller 20 and processing circuitry 22 to perform various functions attributed to HVAC controller 20 and processing circuitry 22 herein. Memory 24 may include any volatile, non-volatile, magnetic, optical, or electrical media, such as RAM, ROM, NVRAM, EEPROM, flash memory, or any other digital media.

Communication circuitry 26 may include any suitable hardware, firmware, software or any combination thereof for communicating with another device, such as user devices 16 or other devices. Under the control of processing circuitry 22, communication circuitry 26 may receive downlink telemetry from, as well as send uplink telemetry to, one of user devices 16 or another device with the aid of an internal or external antenna. Communication circuitry 26 may include a Bluetooth transmitter and receiver, a Wi-Fi transmitter and receiver, a Zigbee transceiver, a near-field communication transceiver, or other circuitry configured to allow HVAC controller 20 to communicate with one or more remote devices such as user devices 16. In some examples, communication circuitry 26 may allow HVAC controller 20 to exchange data with external computing device 123 of FIG. 1. Examples of exchanged data include a desired temperature for the space, one or more control parameters for HVAC system 50, error codes, geographic location, estimated energy usage and cost, and/or other operating parameters or system performance characteristics for HVAC system 50.

In some examples, HVAC controller 20 includes one or more sensors 28 including temperature sensor 30 but not including any proximity sensors. In some examples, temperature sensor 30 is located within a housing of HVAC controller 20. In some examples, temperature sensor 30 is located remotely from HVAC controller 20 and may communicate with HVAC controller 20 via communication circuitry 26. For example, temperature sensor 30 may be located in the same room or the same area as HVAC controller 20 while being separate from HVAC controller 20 such that heat generated from components of HVAC controller 20 does not affect a temperature signal generated by temperature sensor 30. It may be beneficial for temperature sensor 30 to be located separately from HVAC controller 20 in order to obtain an accurate temperature reading. In some examples where temperature sensor 30 is located within the housing of HVAC controller 20, HVAC controller 20 may prevent components from affecting a temperature signal generated by temperature sensor 30.

First user interface 32 may include dial 36. In some examples, a housing of HVAC controller 20 may be substantially cylindrical in shape, and Dial 36 may represent a ring-shaped piece that is located at an outer circumference of HVAC controller 20. In some examples, HVAC controller 20 includes a first face configured to be mounted on a plate which is fixed to a wall or another surface, a second face including a display, and a third face representing a side of HVAC controller 20, the third face extending around a circumference of HVAC controller 20. Dial 36 may include the third face of HVAC controller 20. In some examples, dial 36 is configured to rotate with respect to one or more other components of HVAC controller 20. For example, dial 36 is configured to rotate with respect to digital display 46. In some examples, dial 36 is configured to rotate in response to a user input. Dial 36 may be electrically connected to dial circuitry (not illustrated in FIG. 2) which may generate an electrical signal indicative of one or more rotational parameters (e.g., a rotational position, a rotational velocity, and/or a rotational acceleration) of dial 36. The dial circuitry may output the electrical signal indicative of the one or more rotational parameters to processing circuitry 22. In some examples, the dial circuitry is part of processing circuitry 22.

Digital display 46 may, in some cases, be substantially circular in shape. In some examples, digital display may include a presence sensitive device to detect user inputs to HVAC controller 20B. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Display 37 of HVAC controller 20 may function as an output device using any one or more display devices, such as an LCD, dot matrix display, LED display, organic LED (OLED) display, e-ink, or similar monochrome or color display capable of outputting visible information to a user.

In some examples, digital display 46 may display a set of screens, which may be referred to herein as a "carousel" of screens. In some examples, each screen of the carousel of screens may be related to one or more parameters of an environment in which HVAC controller 20B is located, one or more settings of HVAC controller 20B, and/or one or more other aspects associated with HVAC controller 20B. For example, the carousel of screens may include a time & outdoor temperature screen, a comfort (e.g., inside temperature) screen, an air quality screen, a water screen, an energy screen, and a security screen. In some examples, digital display 46 may scroll through the carousel of screens based on user input. In some examples, digital display 46 may scroll through the carousel of screens without user input.

Processing circuitry 22 may be configured to set and/or change one or more temperature set points corresponding to the space in which HVAC controller 20 regulates temperature. For example, a first set point temperature may represent a cooling set point temperature and a second set point temperature may represent a heating set point temperature. In some examples, if HVAC controller 20 is in a cooling mode and the current temperature is greater than the cooling set point temperature, processing circuitry 22 may control HVAC system 50 to regulate the temperature in the space to approach the cooling set point temperature over a period of time based on the current temperature and the cooling set point temperature. In some examples, if HVAC controller 20 is in a heating mode and the current temperature is less than the heating set point temperature, processing circuitry 22 may control HVAC system 50 to regulate the temperature in the space to approach the heating set point temperature over a period of time based on the current temperature and the heating set point temperature.

In some example, processing circuitry 22 is configured to receive an instruction to change and/or set one or more temperature set points of HVAC controller 20 from dial circuitry electrically connected to dial 36, where the instruction is indicative of a user selection of one or more temperature set points using dial 36. For example, in response to a first rotation of dial 36, processing circuitry 22 may set the cooling temperature set point value to a first temperature value if a cooling set point mode of HVAC controller 20 is activated. In some examples, HVAC controller 20 includes a mode button (not illustrated in FIG. 2) electrically connected to processing circuitry 22 which is configured to generate a signal based on a user request to switch a set point mode between the cooling set point mode and a heating set point mode. In response to a second rotation of dial 36, processing circuitry 22 may set the heating temperature set point value to a second temperature value if a heating set point mode of HVAC controller 20 is activated. In some examples, processing circuitry 22 is configured to receive an instruction to change and/or set one or more temperature set points of HVAC controller 20 from one or more of user devices 16 via network 10. Processing circuitry 22 may change the one or more temperature set points based on such an instruction.

Figure 3:
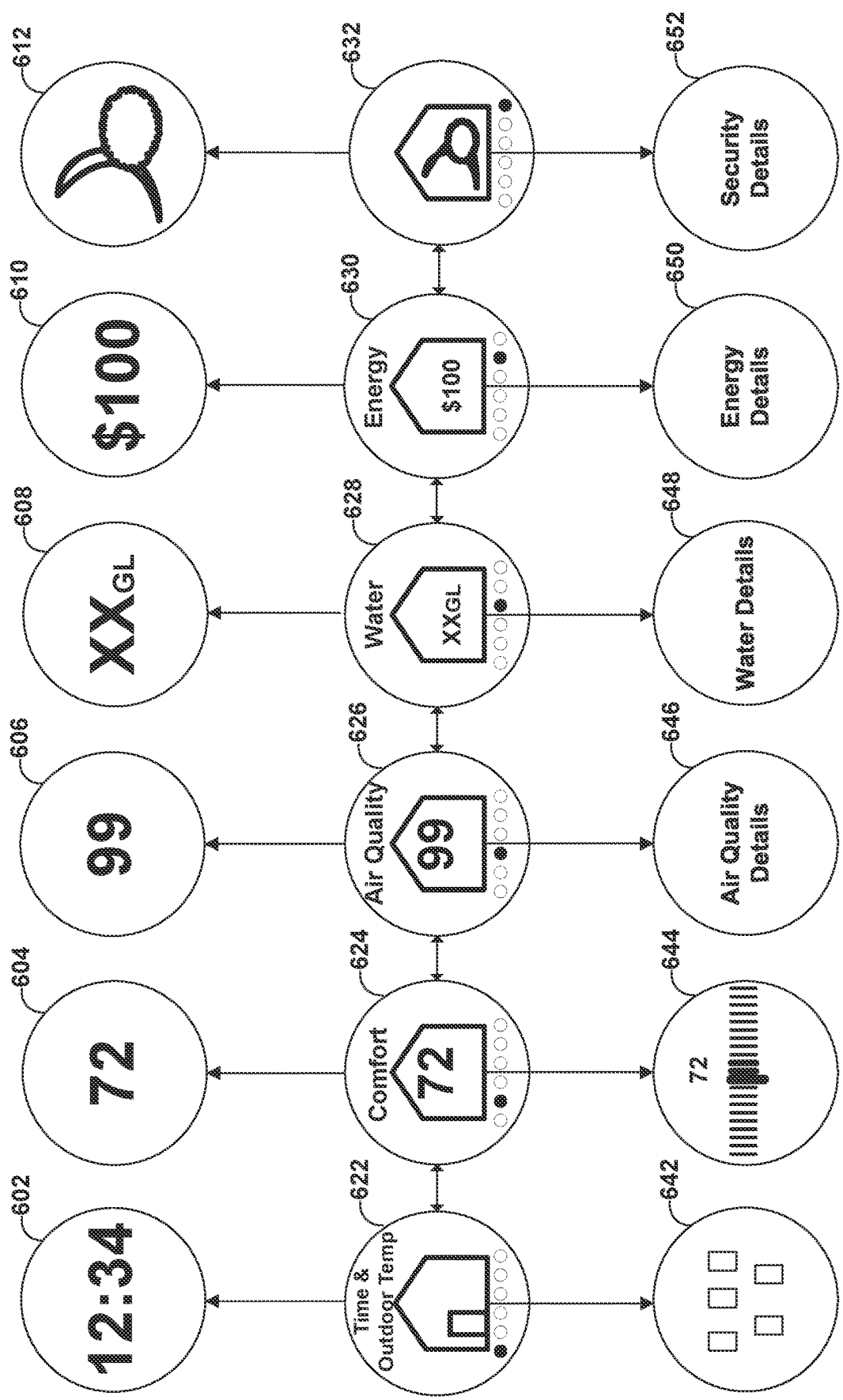
FIG. 3 is a conceptual diagram illustrating a sequence of carousel screens, each carousel screen of the sequence of carousel screens corresponding to an idle screen of a set of idle screens, and each carousel screen of the sequence of carousel screens corresponding to a details screen of the set of details screens, in accordance with one or more techniques described herein.

FIG. 3 is a conceptual diagram illustrating a sequence of carousel screens 622-632, each carousel screen of the sequence of carousel screens corresponding to an idle screen of a set of idle screens 602-612, and each carousel screen of the sequence of carousel screens corresponding to a details screen of the set of details screens 642-652, in accordance with one or more techniques described herein. In some examples, any one of idle screens 602-612, carousel screens 622-632, and details screens 642-652 may be displayed by digital display 46 of HVAC controller 20B of FIG. 3. In some examples, HVAC controller 20B may scroll through the sequence of carousel screens 622-632 based on a user input (e.g., a swipe, a tap, or another tough movement) to digital display 46. In some examples, if HVAC controller 20B swipes through the sequence of carousel screens 622-632 and ends on a particular carousel screen of the sequence of carousel screens 622-632, HVAC controller 20B may set the particular carousel screen as a default carousel screen for HVAC controller 20B.

The sequence of carousel screens 622-632 may include a time & outdoor temp carousel screen 622, a comfort (e.g., inside temperature) carousel screen 624, an air quality carousel screen 626, a water usage carousel screen 628, an energy usage carousel screen 630, and a security carousel screen 632. In some examples, after HVAC controller 20B ceases scrolling through the sequence of carousel screens and stops on a particular carousel screen such as the air quality carousel screen 626, HVAC controller 20B may display the air quality idle screen 606 after a period of time, where the air quality idle screen 606 corresponds to the air quality carousel screen 626. In some examples, idle screens 602-612 may be dimmer as compared with carousel screens 622-632.

In some examples, if the digital display 46 is displaying any one of the set of idle screens 602-612 or any one of the sequence of carousel screens 622-632, HVAC controller 20B may change one or more temperature set points in response to a rotation of dial 36. For example, if digital display 46 is displaying the water usage idle screen 608 and processing circuitry 22 receives information indicative of a rotation of dial 36, processing circuitry 22 may output an instruction for digital display 46 to display the comfort carousel screen 624. Additionally, or alternatively, processing circuitry 22 may update one or more temperature set points in response to the rotation of dial 36. However, if digital display 46 is displaying one of the set of details screens 642-652 when processing circuitry 22 receives information indicative of a rotation of dial 36, processing circuitry 22 may change a nature of the respective one of the set of details screens 642-652 based on the rotation of dial 36 without changing one or more temperature set points. For example, a details screen such as the water consumption detail screen 648 may include scrollable options, and a rotation of dial 36 may cause HVAC controller 20B to scroll through the scrollable options.

In some examples, if electronic display 46 is displaying a carousel screen of carousel screens 622-632, processing circuitry 22 may receive information indicative of a user selection of a menu button of the respective carousel screen. In response to receiving the information indicative of the selection of the menu button, processing circuitry 22 may display the details screen of details screens 642-652 which corresponds to the respective carousel screen of carousel screens 622-632. By switching digital display 46 to a details screen, processing circuitry 22 of HVAC controller 20B may change a function of dial 36 from controlling one or more temperature set points to scrolling through material which is part of the respective details screen. In this way, while a details screen of the set of details screens 642-652 is displayed, the material of the respective details screen may be scrolled, selected, changed, or any combination thereof based on one or both of a rotation of dial 36 or a user input to digital display 46.

Dial 36 may represent a physical ring which exists surrounding the digital display 46. Rotating dial 36 is one type of input, while touching, swiping, or otherwise interacting directly on digital display 46 is a second type of input. Either the first type of input or the second type of input may be used to navigate display screens 642-652, without a rotation of dial 36 causing a temperature set point to change. In some examples, processing circuitry 22 may be able to perform the same functions based on the first type of input and the second type of input with respect to display screens 642-652. For example, processing circuitry 22 may be configured to scroll through options on the water consumption details screen 648 based on a rotation of dial 36 and processing circuitry 22 may be configured to similarly scroll through options on the water consumption details screen 648 based on receiving information indicative of a user instruction to scroll input to digital display 46.

In accordance with aspects of the present disclosure, HVAC controller 20 may switch from outputting carousel screens 622-632 to idle screens 602-612 in response to determining, without the use of a proximity sensor, that no users are physically proximate to HVAC controller 20. More specifically, each time processing circuitry 22 receives an indication of user input at a user interface device of HVAC controller 20, such as an indication of a rotation of dial 36, an indication of touch input sensed by display 46, or any other indication of a physical interaction with HVAC controller 20 by a user, processing circuitry 22 may track the elapsed time since receiving the indication of user input, and may reset the elapsed time and restart the timer upon receiving a subsequent indication of user input. If processing circuitry 22 determines that the elapsed time since the indication of user input reaches or exceeds a specified timeout period (e.g., 45 seconds) without processing circuitry receiving an indication of a subsequent user input at HVAC controller 20 prior to the timeout period, then processing circuitry 22 may determine that no users are physically proximate to HVAC controller 20.

When the time elapsed since a most recent user interaction with HVAC controller 20 reaches or exceeds a specified timeout period, processing circuitry 22 may, in response, determine that no users are physically proximate to HVAC controller 20, and may switch from outputting one of the carousel screens 622-632 at display 46 to outputting one of the corresponding idle screens 602-612 for display at display 46. Processing circuitry 22 may remain in the idle state until it receives an indication of user input at a user input device of HVAC controller 20, upon which processing circuitry 22 may transition from the idle state back to the active state.

Thus, in some examples, when HVAC controller 20 is in an active state, HVAC controller 20 may output one of carousel screens 622-632 for display at display 46. When HVAC controller 20 determine that no users are physically proximate to HVAC controller 20, HVAC controller 20 may transition from an active state to an idle state, and may correspondingly transition from outputting one of the carousel screens 622-632 at display 46 to outputting one of the corresponding idle screens 602-612 for display at display 46. The idle screens 602-612 may include at least some of the same information as included in the corresponding carousel screens 622-632, and the information included in idle screens 602-612 may be displayed at display 46 in a way that visually emphasizes the information included in idle screens 602-612 (e.g., by increasing the output size of the information) compared with the same information included in carousel screens 622-632. While the HVAC controller 20 is in an idle state, HVAC controller 20 may, upon receiving an indication of user interaction with HVAC controller 20, HVAC controller 20 may transition from the idle state back to the active state, and may correspondingly transition from outputting one of the idle screens 602-612 at display 46 to outputting one of the corresponding carousel screens 622-632 for display at display 46.

Figure 4A:
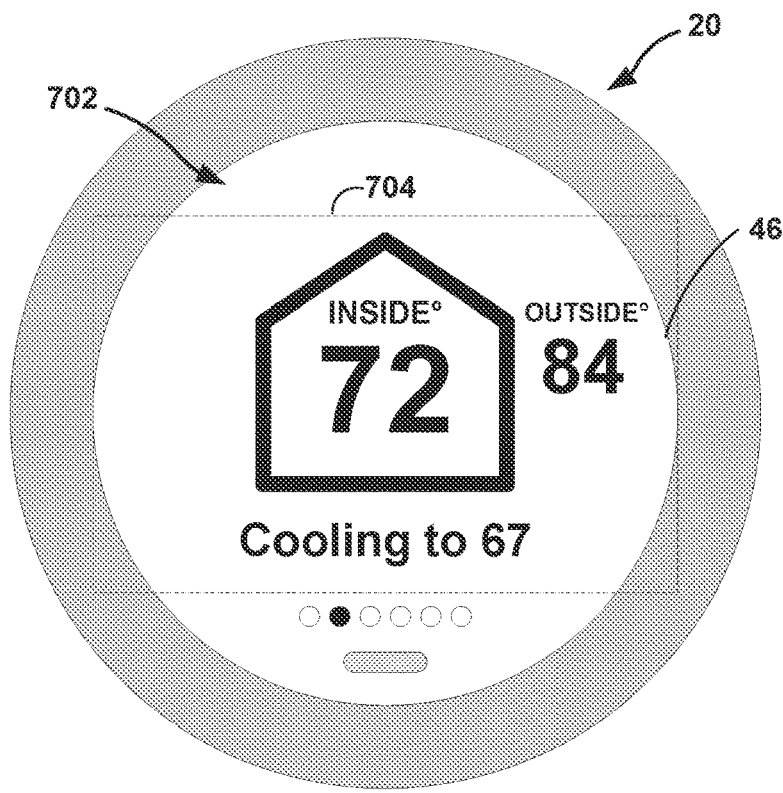
FIGS. 4A-4K illustrate examples of an HVAC controller switching between example carousel screens and example idle screens in further detail.

FIGS. 4A-4K illustrate examples of HVAC controller 20 switching between example carousel screens and example idle screens in further detail. As shown in FIG. 4A, HVAC controller 20 may be in an active state and may, while in the active state, output carousel screen 702 that includes information 704 regarding air temperature for display at display 46 of HVAC control 20. HVAC controller 20 may be in the active state as long as HVAC has yet to determine that that no users are physically proximate to HVAC controller 20.

Information 704 may include the indoor air temperature, such as detected by one or more sensors 28 of HVAC system 50, the outdoor air temperature, such as detected by one or more sensors 28 of HVAC system 50 or received from an external source (e.g., the Internet), and a status of HVAC system 50, such as information informing the user that HVAC system 50 is cooling to 67 degrees. Information such as the indoor air temperature may be the primary information currently being displayed at display 46, while information such as the outdoor air temperature and the status of HVAC system 50 may be the secondary information currently displayed at display 46.

When HVAC controller 20 determines that no users are physically proximate to HVAC controller 20, HVAC controller 20 may transition from the active state to an idle state. When HVAC controller 20 switches from being in an active state to being in an idle state, HVAC controller 20 may update the visual representation of the information that it outputs for display at display 46 to increase the legibility of information 704 for users that are not physically proximate to HVAC controller 20, such as by increasing the text size of information 704, magnifying information 704, or otherwise visually emphasizing information 704. In this way, users that are physically far from HVAC controller 20, such as users more than 3 feet, 5 feet, 10 feet, and the like away from HVAC controller 20 but having a line of sight to display 46 may nonetheless be able to legibly read information 704 displayed at display 46.

Figure 4B:
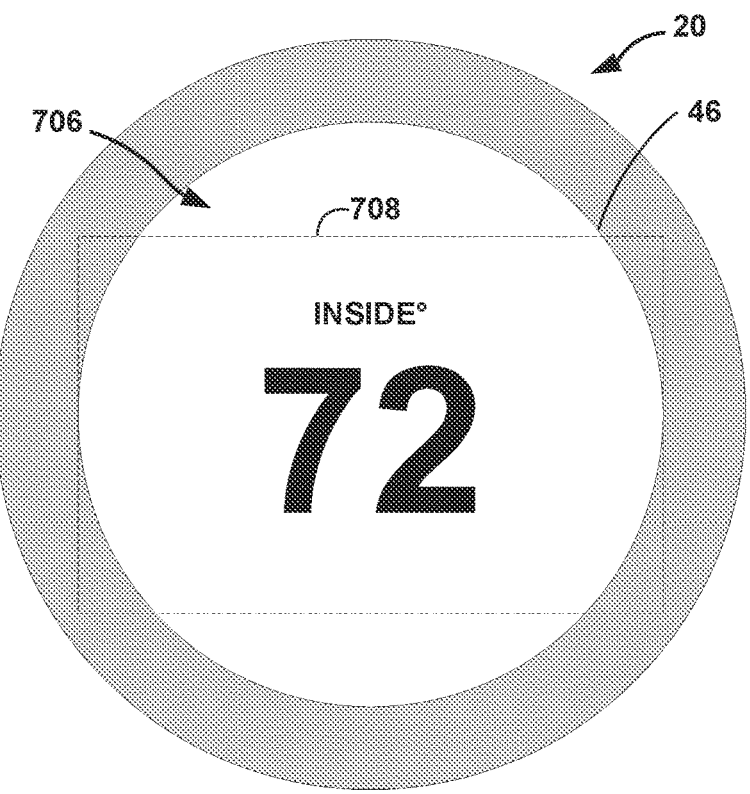

For example, HVAC controller 20 may visually emphasize information 704 displayed at display 46 during an idle state compared with information 704 displayed at display 46 during the active state, such as by bolding the text in information 704, increasing the text size of information 704, and the like in a way that increases legibility of information 704 to users that view display 46 while not being physically proximate to HVAC controller 20. As shown in FIG. 4B, HVAC controller may, in response to determining that no users are physically proximate to HVAC controller 20, transition from outputting carousel screen 702 that includes information 704 for display at display 46 to outputting a corresponding idle screen 706 that includes information 708 for display at display 46, where information 708 is visually emphasized at display 46 compared with information 704. For example, information 708 in idle screen 706 outputted by HVAC controller 20 for display at display 46 may be of a greater text size than information 704 displayed at display 46, may have its text bolded compared with information 704 displayed at display 46, and the like.

Information 708 in idle screen 706 outputted by HVAC controller 20 may include at least a portion of information 704 in carousel screen 702 outputted by HVAC controller 20 at display 46. For example, information 708 may include the primary information in information 704, which is the indoor air temperature, while excluding the secondary information in information 704, such as the outdoor air temperature and the status of HVAC system 50. By refraining from outputting such secondary information in information 704, display 46 may have greater room in which to present the primary information of information 704 as information 708, such as by increasing the text size of the primary information of information 704 as information 708, thereby increasing the legibility of information 708 displayed at display 46.

While HVAC controller 20 is in the idle state, HVAC controller 20 may transition back to the active state upon detects a user interaction with HVAC controller 20. For example, when HVAC controller 20 detects a user interaction with HVAC controller 20, HVAC controller 20 may transition from outputting idle screen 706 that includes information 708 for display at display 46 back to outputting carousel screen 702 that includes information 704 for display at display 46, such as shown in FIG. 4A.

Figure 4C:
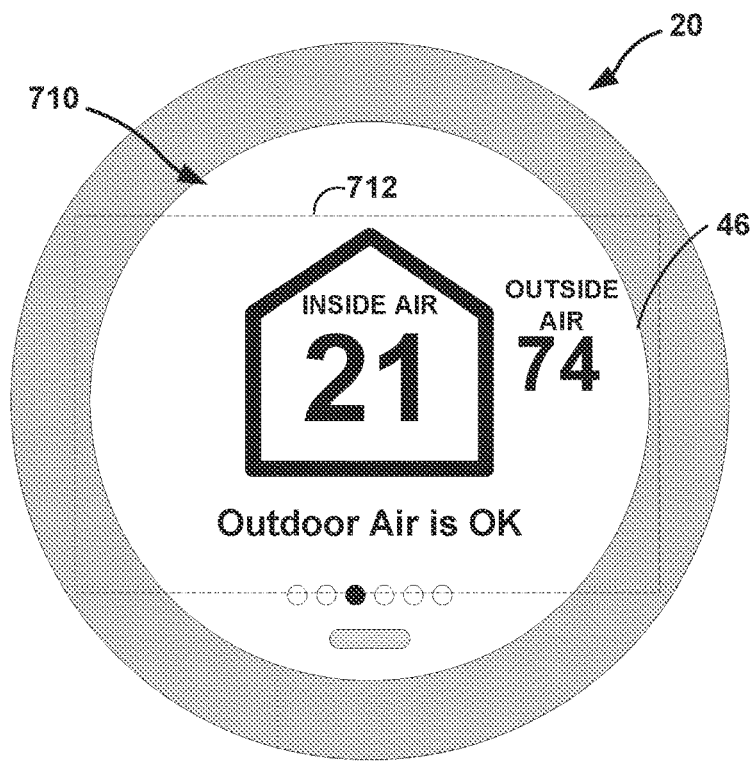
Figure 4D:
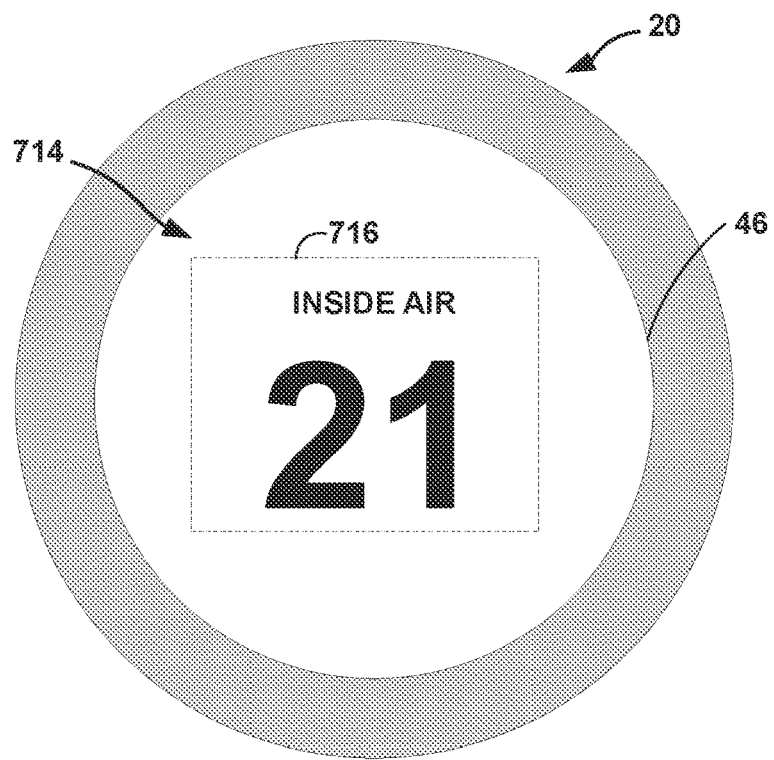
Figure 4E:
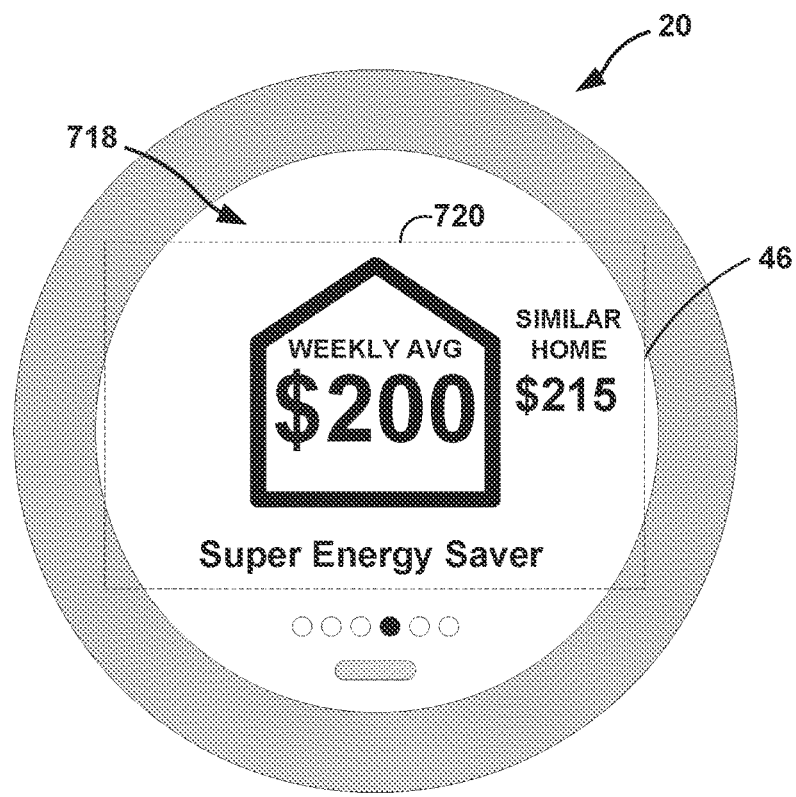
Figure 4F:
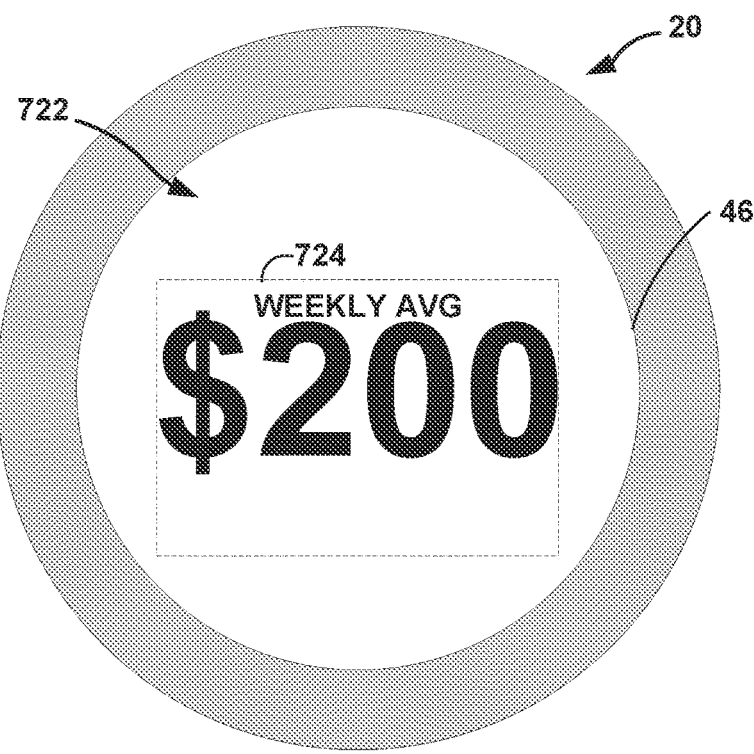
Figure 4G:
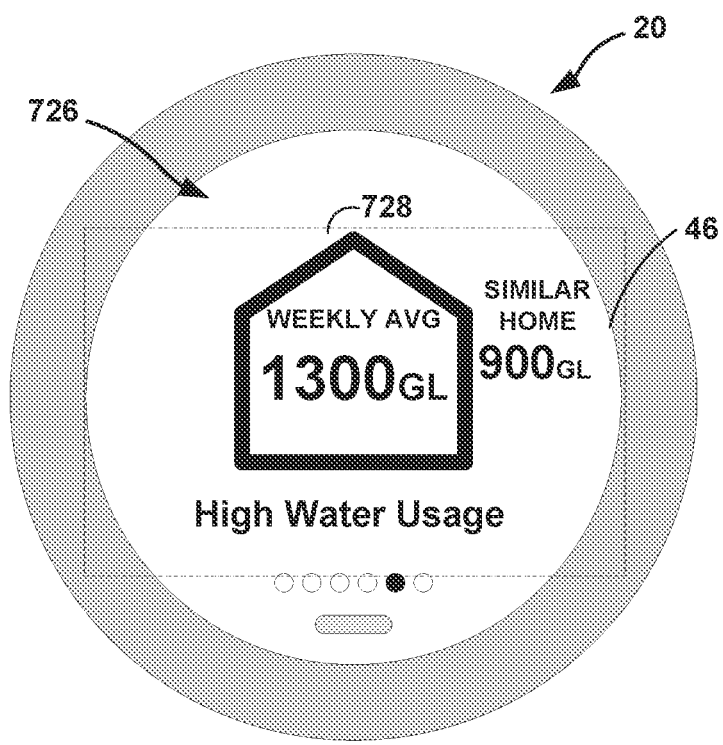
Figure 4H:
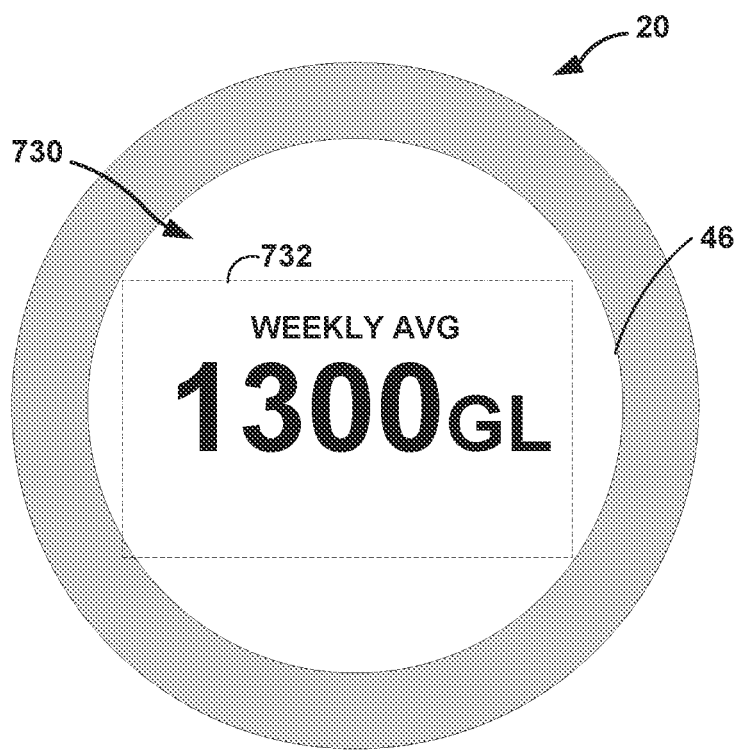
Figure 4I:
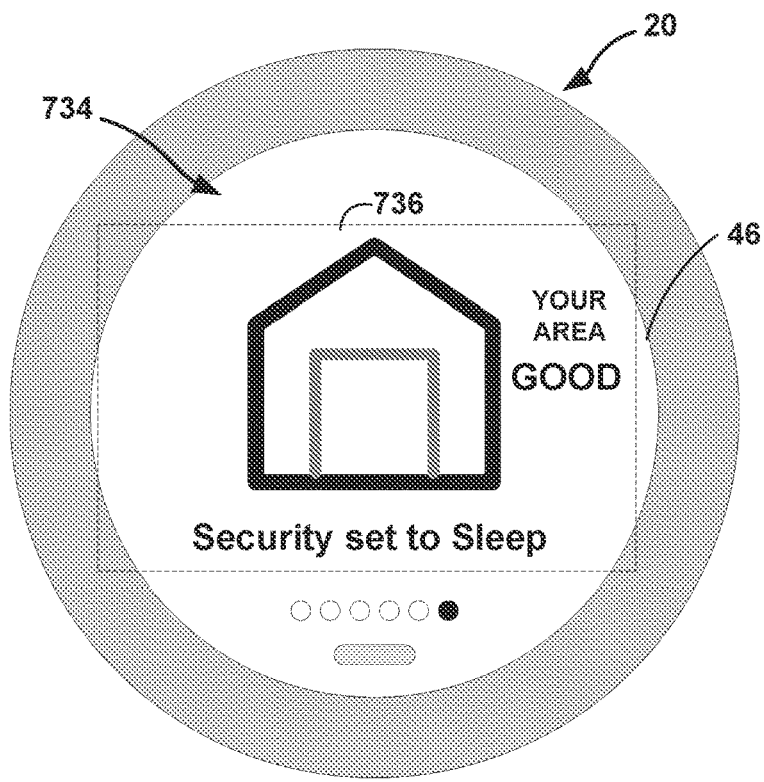
Figure 4J:
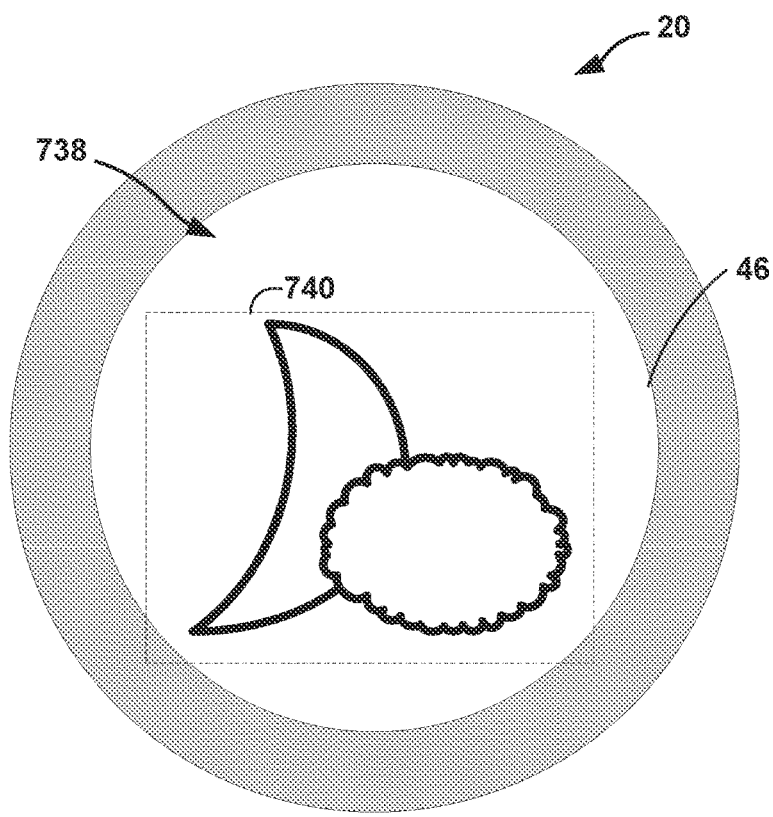
Figure 4K:
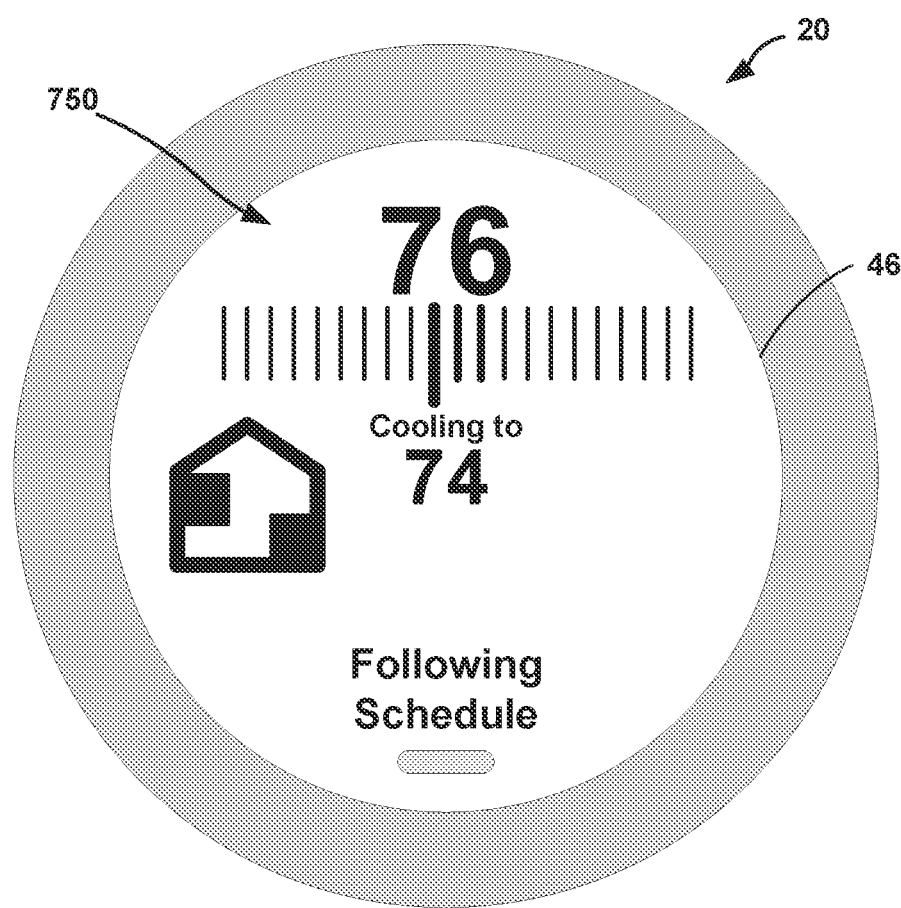

In some examples, while HVAC controller 20 is in the idle state, HVAC controller 20 may, in response to receiving an indication of user input at a user interface device of HVAC controller 20, such as an indication of a touch-base input received by display 46 or information indicative of a rotation of dial 36, HVAC controller 20 may transition from outputting idle screen 706 that includes information 708 for display at display 46 to outputting a details screen similar to one of details screens 642-652, such as detail screen 750 as shown in FIG. 4K. As shown in FIG. 4K, detail screen 750 may include detailed information associated with HVAC system 50. For example, detail screen 750 may include information regarding the status of HVAC system 50, controls for controlling HVAC system 50, and the like.

As shown in FIG. 4C, HVAC controller 20 may be in an active state and may, while in the active state, output carousel screen 710 that includes information 712 regarding air quality for display at display 46 of HVAC control 20. HVAC controller 20 may be in the active state as long as HVAC has yet to determine that that no users are physically proximate to HVAC controller 20.

Information 712 may include the indoor quality, such as detected by one or more sensors 28 of HVAC system 50, the outdoor air quality, such as detected by one or more sensors 28 of HVAC system 50 or received from an external source (e.g., the Internet), and an air quality status, such as information informing the user the outdoor air quality is OK. Information such as the indoor air quality may be the primary information currently being displayed at display 46, while information such as the outdoor air quality and the air quality status may be the secondary information currently displayed at display 46.

When HVAC controller 20 determines that no users are physically proximate to HVAC controller 20, HVAC controller 20 may transition from the active state to an idle state. When HVAC controller 20 switches from being in an active state to being in an idle state, HVAC controller 20 may update the visual representation of the information that it outputs for display at display 46 to increase the legibility of information 712 for users that are not physically proximate to HVAC controller 20, such as by increasing the text size of information 712, magnifying information 712, or otherwise visually emphasizing information 712. In this way, users that are physically far from HVAC controller 20, such as users more than 3 feet, 5 feet, 10 feet, and the like away from HVAC controller 20 but having a line of sight to display 46 may nonetheless be able to legibly read information 712 displayed at display 46.

For example, HVAC controller 20 may visually emphasize information 712 displayed at display 46 during the idle state compared with information 712 displayed at display 46 during the active state, such as by bolding the text in information 712, increasing the text size of information 712, and the like in a way that increases legibility of information 712 to users that view display 46 while not being physically proximate to HVAC controller 20. As shown in FIG. 4D, HVAC controller may, in response to determining that no users are physically proximate to HVAC controller 20, transition from outputting carousel screen 710 that includes information 712 for display at display 46 to outputting a corresponding idle screen 714 that includes information 716 for display at display 46, where information 716 is visually emphasized at display 46 compared with information 712. For example, information 716 in idle screen 714 outputted by HVAC controller 20 for display at display 46 may be of a greater text size than information 712 displayed at display 46, may have its text bolded compared with information 712 displayed at display 46, and the like.

Information 716 in idle screen 714 outputted by HVAC controller 20 may include at least a portion of information 712 in carousel screen 710 outputted by HVAC controller 20 at display 46. For example, information 716 may include the primary information in information 712, which is the indoor air quality, while excluding the secondary information in information 712, such as the outdoor air quality and the air quality status. By refraining from outputting such secondary information in information 712, display 46 may have greater room in which to present the primary information of information 712 as information 716, such as by increasing the text size of the primary information of information 712 as information 708, thereby increasing the legibility of information 716 displayed at display 46.

While HVAC controller 20 is in the idle state, HVAC controller 20 may transition back to the active state upon detects a user interaction with HVAC controller 20. For example, when HVAC controller 20 detects a user interaction with HVAC controller 20, HVAC controller 20 may transition from outputting idle screen 714 that includes information 716 for display at display 46 back to outputting carousel screen 710 that includes information 712 for display at display 46, such as shown in FIG. 4A.

In some examples, while HVAC controller 20 is in the idle state, HVAC controller 20 may, in response to receiving an indication of user input at a user interface device of HVAC controller 20, such as an indication of a touch-base input received by display 46 or information indicative of a rotation of dial 36, HVAC controller 20 may transition from outputting idle screen 714 that includes information 716 for display at display 46 to outputting a details screen similar to one of details screens 642-652, such as detail screen 750 as shown in FIG. 4K.

As shown in FIG. 4E, HVAC controller 20 may be in an active state and may, while in the active state, output carousel screen 718 that includes information 720 regarding energy usage for display at display 46 of HVAC control 20. HVAC controller 20 may be in the active state as long as HVAC has yet to determine that that no users are physically proximate to HVAC controller 20.

Information 720 may include the energy usage of a building such as building 102, or the energy usage of one or more rooms or portions of building 102, such as in terms of energy usage costs, the energy usage costs of other similar buildings or homes, such as received from an external source (e.g., the Internet), and an energy usage status, such as information informing the user that the user is a super energy saver. Information such as the energy usage costs of building 102 may be the primary information currently being displayed at display 46, while information such as the energy usage costs of other similar buildings or homes and the energy usage status may be the secondary information currently displayed at display 46.

When HVAC controller 20 determines that no users are physically proximate to HVAC controller 20, HVAC controller 20 may transition from the active state to an idle state. When HVAC controller 20 switches from being in an active state to being in an idle state, HVAC controller 20 may update the visual representation of the information that it outputs for display at display 46 to increase the legibility of information 720 for users that are not physically proximate to HVAC controller 20, such as by increasing the text size of information 720, magnifying information 720, or otherwise visually emphasizing information 720. In this way, users that are physically far from HVAC controller 20, such as users more than 3 feet, 5 feet, 10 feet, and the like away from HVAC controller 20 but having a line of sight to display 46 may nonetheless be able to legibly read information 720 displayed at display 46.

For example, HVAC controller 20 may visually emphasize information 720 displayed at display 46 during the idle state compared with information 720 displayed at display 46 during the active state, such as by bolding the text in information 720, increasing the text size of information 720, and the like in a way that increases legibility of information 720 to users that view display 46 while not being physically proximate to HVAC controller 20. As shown in FIG. 4F, HVAC controller may, in response to determining that no users are physically proximate to HVAC controller 20, transition from outputting carousel screen 718 that includes information 720 for display at display 46 to outputting a corresponding idle screen 722 that includes information 724 for display at display 46, where information 724 is visually emphasized at display 46 compared with information 720. For example, information 724 in idle screen 722 outputted by HVAC controller 20 for display at display 46 may be of a greater text size than information 720 displayed at display 46, may have its text bolded compared with information 720 displayed at display 46, and the like.

Information 724 in idle screen 722 outputted by HVAC controller 20 may include at least a portion of information 720 in carousel screen 710 outputted by HVAC controller 20 at display 46. For example, information 724 may include the primary information in information 720, which is the energy usage costs of building 102, while excluding the secondary information in information 720, such as the energy usage costs of similar homes the energy usage status. By refraining from outputting such secondary information in information 720, display 46 may have greater room in which to present the primary information of information 720 as information 724, such as by increasing the text size of the primary information of information 720 as information 724, thereby increasing the legibility of information 724 displayed at display 46.

While HVAC controller 20 is in the idle state, HVAC controller 20 may transition back to the active state upon detects a user interaction with HVAC controller 20. For example, when HVAC controller 20 detects a user interaction with HVAC controller 20, HVAC controller 20 may transition from outputting idle screen 722 that includes information 724 for display at display 46 back to outputting carousel screen 718 that includes information 720 for display at display 46, such as shown in FIG. 4E.

In some examples, while HVAC controller 20 is in the idle state, HVAC controller 20 may, in response to receiving an indication of user input at a user interface device of HVAC controller 20, such as an indication of a touch-base input received by display 46 or information indicative of a rotation of dial 36, HVAC controller 20 may transition from outputting idle screen 722 that includes information 724 for display at display 46 to outputting a details screen similar to one of details screens 642-652, such as detail screen 750 as shown in FIG. 4K.

As shown in FIG. 4G, HVAC controller 20 may be in an active state and may, while in the active state, output carousel screen 726 that includes information 728 regarding water usage for display at display 46 of HVAC control 20. HVAC controller 20 may be in the active state as long as HVAC has yet to determine that that no users are physically proximate to HVAC controller 20.

Information 728 may include the water usage of a building such as building 102, or the water usage of one or more rooms or portions of building 102, such as in gallons, the water usage of other similar buildings or homes, such as received from an external source (e.g., the Internet), and a water usage status, such as information informing the user has high water usage. Information such as the water usage of building 102 may be the primary information currently being displayed at display 46, while information such as the water usage of other similar buildings or homes and the water usage status may be the secondary information currently displayed at display 46.

When HVAC controller 20 determines that no users are physically proximate to HVAC controller 20, HVAC controller 20 may transition from the active state to an idle state.

When HVAC controller 20 switches from being in an active state to being in an idle state, HVAC controller 20 may update the visual representation of the information that it outputs for display at display 46 to increase the legibility of information 728 for users that are not physically proximate to HVAC controller 20, such as by increasing the text size of information 728, magnifying information 728, or otherwise visually emphasizing information 728. In this way, users that are physically far from HVAC controller 20, such as users more than 3 feet, 5 feet, 10 feet, and the like away from HVAC controller 20 but having a line of sight to display 46 may nonetheless be able to legibly read information 720 displayed at display 46.

For example, HVAC controller 20 may visually emphasize information 728 displayed at display 46 during the idle state compared with information 728 displayed at display 46 during the active state, such as by bolding the text in information 728, increasing the text size of information 728, and the like in a way that increases legibility of information 728 to users that view display 46 while not being physically proximate to HVAC controller 20. As shown in FIG. 4H, HVAC controller may, in response to determining that no users are physically proximate to HVAC controller 20, transition from outputting carousel screen 726 that includes information 728 for display at display 46 to outputting a corresponding idle screen 730 that includes information 732 for display at display 46, where information 732 is visually emphasized at display 46 compared with information 728. For example, information 732 in idle screen 730 outputted by HVAC controller 20 for display at display 46 may be of a greater text size than information 728 displayed at display 46, may have its text bolded compared with information 728 displayed at display 46, and the like.

Information 732 in idle screen 730 outputted by HVAC controller 20 may include at least a portion of information 728 in carousel screen 726 outputted by HVAC controller 20 at display 46. For example, information 732 may include the primary information in information 728, which is the water usage of building 102, while excluding the secondary information in information 728, such as the water usage of similar homes or the water usage status. By refraining from outputting such secondary information in information 728, display 46 may have greater room in which to present the primary information of information 728 as information 732, such as by increasing the text size of the primary information of information 728 as information 732, thereby increasing the legibility of information 732 displayed at display 46.

While HVAC controller 20 is in the idle state, HVAC controller 20 may transition back to the active state upon detects a user interaction with HVAC controller 20. For example, when HVAC controller 20 detects a user interaction with HVAC controller 20, HVAC controller 20 may transition from outputting idle screen 730 that includes information 732 for display at display 46 back to outputting carousel screen 726 that includes information 728 for display at display 46, such as shown in FIG. 4G.

In some examples, while HVAC controller 20 is in the idle state, HVAC controller 20 may, in response to receiving an indication of user input at a user interface device of HVAC controller 20, such as an indication of a touch-base input received by display 46 or information indicative of a rotation of dial 36, HVAC controller 20 may transition from outputting idle screen 730 that includes information 732 for display at display 46 to outputting a details screen similar to one of details screens 642-652, such as detail screen 750 as shown in FIG. 4K.

As shown in FIG. 4I, HVAC controller 20 may be in an active state and may, while in the active state, output carousel screen 734 that includes information 736 regarding security system settings of a building, such as building 102, for display at display 46 of HVAC control 20. HVAC controller 20 may be in the active state as long as HVAC has yet to determine that that no users are physically proximate to HVAC controller 20.

When HVAC controller 20 determines that no users are physically proximate to HVAC controller 20, HVAC controller 20 may transition from the active state to an idle state. When HVAC controller 20 switches from being in an active state to being in an idle state, HVAC controller 20 may update the visual representation of the information that it outputs for display at display 46 to increase the legibility of information 736 for users that are not physically proximate to HVAC controller 20.

As shown in FIG. 4J, HVAC controller may, in response to determining that no users are physically proximate to HVAC controller 20, transition from outputting carousel screen 734 that includes information 736 for display at display 46 to outputting a corresponding idle screen 738 that includes information 740 for display at display 46, where information 740 is visually emphasized at display 46 compared with information 736. For example, information 740 in idle screen 738 outputted by HVAC controller 20 for display at display 46 may be a graphic image that indicates the security alarm settings of building 102 that is different from and larger, more legible than information 736.

While HVAC controller 20 is in the idle state, HVAC controller 20 may transition back to the active state upon detects a user interaction with HVAC controller 20. For example, when HVAC controller 20 detects a user interaction with HVAC controller 20, HVAC controller 20 may transition from outputting idle screen 738 that includes information 740 for display at display 46 back to outputting carousel screen 734 that includes information 736 for display at display 46, such as shown in FIG. 4I.

In some examples, while HVAC controller 20 is in the idle state, HVAC controller 20 may, in response to receiving an indication of user input at a user interface device of HVAC controller 20, such as an indication of a touch-base input received by display 46 or information indicative of a rotation of dial 36, HVAC controller 20 may transition from outputting idle screen 738 that includes information 740 for display at display 46 to outputting a details screen similar to one of details screens 642-652, such as detail screen 750 as shown in FIG. 4K.

Figure 5:
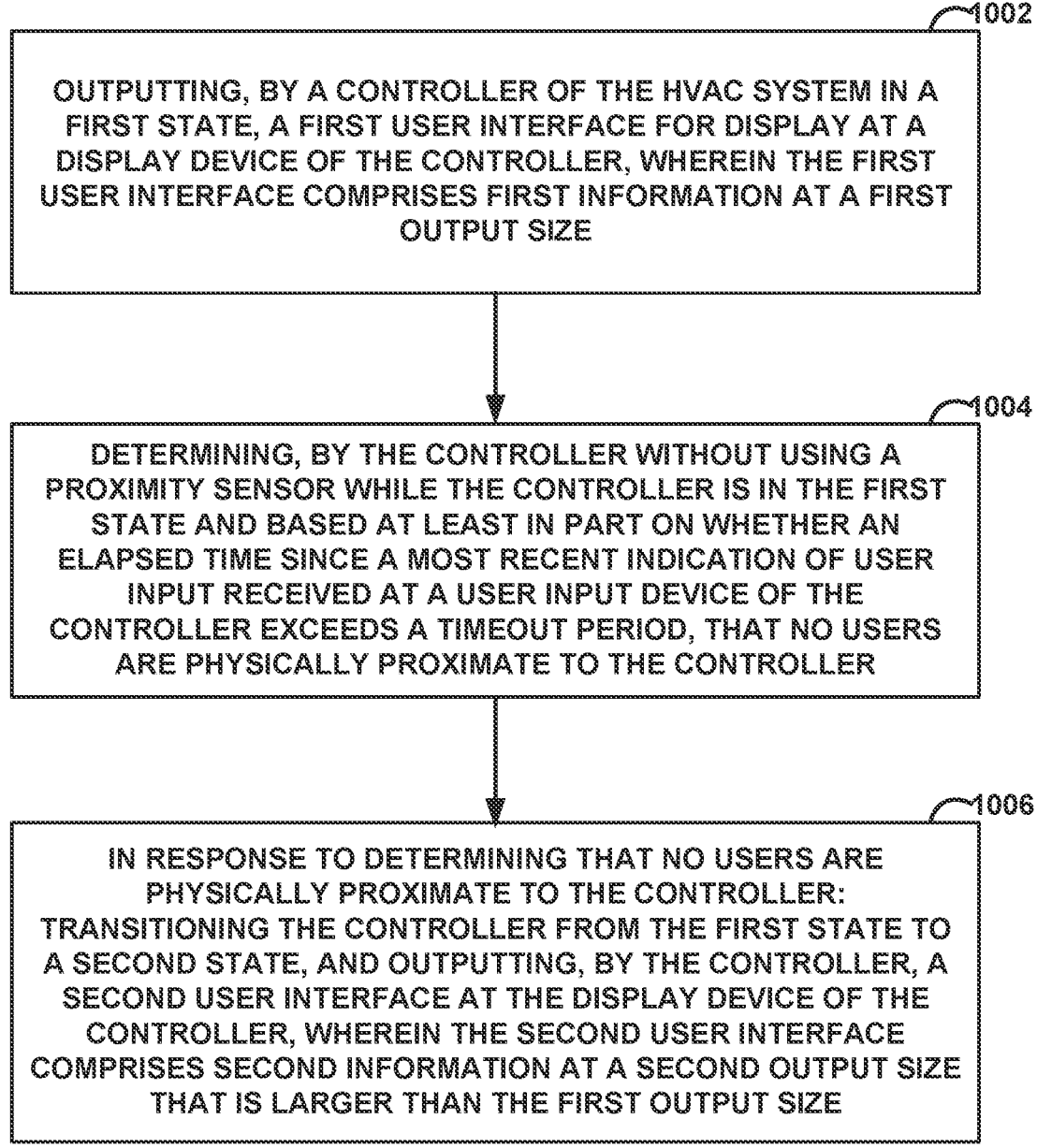
FIG. 5 is a flow diagram illustrating an example operation of a controller for determining that no users are physically proximate to controller in accordance with one or more techniques described herein.

FIG. 5 is a flow diagram illustrating an example operation of HVAC controller 20 for determining that no users are physically proximate to HVAC controller 20 in accordance with one or more techniques described herein. FIG. 11 is described with respect to HVAC controller 20 and HVAC system 50 of FIG. 1 and FIG. 2. However, the techniques of FIG. 5 may be performed by different components of HVAC controller 20 and HVAC system 50 or by additional or alternative devices.

As shown in FIG. 5, a controller 20 in a first state may output a first user interface for display at a display 46 of the controller 20, wherein the first user interface comprises first information at a first output size (1002).

The controller 20 may further determine, while in the first state and based at least in part on whether an elapsed time since the most recent indication of user input received at a user input device of the controller 20 exceeds a timeout period, that no users are physically proximate to the controller (1004). In some examples, determining, based at least in part on whether the elapsed time since the most recent indication of user input received at the user input device of the controller 20 exceeds the timeout period further includes determining, by the controller 20, that no users are physically proximate to the controller 20 based at least in part on determining that the elapsed time since the most recent indication of user input received at the user input device of the controller exceeds the timeout period. In some examples, the user interface device of the controller 20 comprises one of: a physical control of the controller 20 or a touch-sensitive input device of the controller 20.

The controller 20 may, in response to determining that no users are physically proximate to the controller: transitioning the controller 20 from the first state to a second state, and output, a second user interface at the display device of the controller, wherein the second user interface comprises second information at a second output size that is larger than the first output size (1006). In some examples, the first output size comprises a first font size, the second output size comprises a second font size, and the second font size is larger than the first font size.

In some examples, the first information comprises a primary information and a secondary information associated with the HVAC system 50, and wherein the second information comprises the primary information and does not comprise the secondary information. In some examples, the first information and the second information comprise one or more of: temperature information, air quality information, energy savings information, water usage information, or security information associated with the building.

In some examples, the controller 20 may receive, at a user input device of the controller 20 while in the second state, an indication of user input. The controller 20 may, in response to receiving the indication of user input while the controller 20 is in the second state: transition the controller 20 from the second state to the first state and output the first user interface for display at a display 46 of the controller 20, wherein the first user interface comprises the first information that is displayed at the first output size by the display 46.

In some examples, the controller 20 may receive, at a user input device of the controller 20 while in the second state, an indication of user input. The controller 20 may, in response to receiving the indication of the user input while the controller 20 in the second state, output a third user interface for display at the display 46 of the controller 20, where the third user interface comprises a user interface for controlling the HVAC system 50.

In some examples, the controller 20 comprises a thermostat for the HVAC system 50.

In some examples, the first state is an active state and the second state is an idle state.

This disclosure contains the following aspects:

Aspect 1: A method for controlling a heating, ventilation, and air conditioning (HVAC) system for a building includes outputting, by a controller of a HVAC system for a building, while the controller is in a first state, a first user interface for display at a display device of the controller, wherein the first user interface comprises first information that is displayed by the display device at a first output size; determining, by the controller without using a proximity sensor while the controller is in the first state and based at least in part on whether an elapsed time since a most recent indication of user input received at a user input device of the controller exceeds a timeout period, that no users are physically proximate to the controller; and in response to determining that no users are physically proximate to the controller: transitioning the controller from the first state to a second state, and outputting, by the controller, a second user interface at the display device of the controller, wherein the second user interface comprises second information that is displayed by the display device at a second output size that is larger than the first output size.

Aspect 2: The method of aspect 1, wherein determining that no users are physically proximate to the controller further comprises: determining, by the controller, that no users are physically proximate to the controller based at least in part on determining that the elapsed time since the most recent indication of user input received at the user input device of the controller exceeds the timeout period.

Aspect 3: The method of aspect 2, wherein the user input device of the controller comprises one of: a physical control of the controller or a touch-sensitive input device of the controller.

Aspect 4: The method of any of aspects 1 through 3, wherein the first output size comprises a first font size, the second output size comprises a second font size, and the second font size is larger than the first font size.

Aspect 5: The method of any of aspects 1 through 4, wherein the first information comprises a primary information and a secondary information associated with the HVAC system, and wherein the second information comprises the primary information and does not comprise the secondary information.

Aspect 6: The method of aspect 5, wherein the first information and the second information comprise one or more of: temperature information, air quality information, energy savings information, water usage information, or security information associated with the building.

Aspect 7: The method of any of aspects 1 through 6, further includes receiving, at the user input device of the controller while in the second state, an indication of user input; and in response to receiving the indication of user input while the controller is in the second state: transitioning, by the controller, the controller from the second state to the first state, and outputting, by the controller, the first user interface for display at the display device of the controller, wherein the first user interface comprises the first information that is displayed at the first output size by the display device.

Aspect 8: The method of any of aspects 1 through 7, further includes receiving, at the user input device of the controller while in the second state, an indication of user input; and in response to receiving the indication of user input while the controller is in the second state, outputting, by the controller, a third user interface for display at the display device of the controller, wherein the third user interface comprises a user interface for controlling the HVAC system.

Aspect 9: The method of any of aspects 1 through 8, wherein the controller comprises a thermostat for the HVAC system.

Aspect 10: The method of any of aspects 1 through 9, wherein the first state is an active state and the second state is an idle state.

Aspect 11: A controller device for a heating, ventilation, and air conditioning (HVAC) system in a building, the controller device includes a display device; and processing circuitry configured to: output, while the controller device is in a first state, a first user interface for display at the display device, wherein the first user interface comprises first information at a first output size; determine, without using a proximity sensor while the controller device is in the first state and based at least in part on whether an elapsed time since a most recent indication of user input received at a user input device of the controller device exceeds a timeout period, that no users are physically proximate to the controller device; and in response to determining that no users are physically proximate to the controller device: transition the controller device from the first state to a second state, and output a second user interface at the display device of the controller, wherein the second user interface comprises second information at a second output size that is larger than the first output size.

Aspect 12: The controller device of aspect 11, wherein to determine that no users are physically proximate to the controller, the processing circuitry is further configured to: determine that no users are physically proximate to the controller based at least in part on determining that the elapsed time since the most recent indication of user input received at the user input device of the controller exceeds the timeout period.

Aspect 13: The controller device of aspect 12, wherein the user input device of the controller device comprises one of: a physical control of the controller or a touch-sensitive input device of the controller.

Aspect 14: The controller device of any of aspects 11 through 13, wherein the first output size comprises a first font size, the second output size comprises a second font size, and the second font size is larger than the first font size.

Aspect 15: The controller device of any of aspects 11 through 14, wherein the first information comprises a primary information and a secondary information associated with the HVAC system, and wherein the second information comprises the primary information and does not comprise the secondary information.

Aspect 16: The controller device of aspect 15, wherein the first information and the second information comprise one or more of: temperature information, air quality information, energy savings information, water usage information, or security information associated with the building.

Aspect 17: The controller device of any of aspects 11 through 16, wherein the processing circuitry is further configured to: receive, while in the second state, an indication of user input at the user input device of the controller device; and in response to receiving the indication of user input while the controller device is in the second state: transition the controller device from the second state to the first state, and output the first user interface for display at the display device, wherein the first user interface comprises the first information that is displayed at the first output size by the display device.

Aspect 18: The controller device of any of aspects 11 through 17, wherein the processing circuitry is further configured to: receive, at the user input device of the controller device while in the second state, an indication of user input; and in response to receiving the indication of user input while the controller device is in the second state, output a third user interface for display at the display device of the controller device, wherein the third user interface comprises a user interface for controlling the HVAC system.

Aspect 19: The controller device of any of aspects 11 through 18, wherein the controller device comprises a thermostat for the HVAC system.

Aspect 20: The controller device of any of aspects 11 through 19, wherein the first state is an active state and the second state is an idle state.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

The invention claimed is:

1. A method for controlling a heating, ventilation, and air conditioning (HVAC) system for a building, the method comprising:
   outputting, by a controller of a HVAC system for a building, while the controller is in a first state, a first user interface for display at a display device of the controller, wherein the first user interface comprises first information that is displayed by the display device at a first output size;
   determining, by the controller without using a proximity sensor while the controller is in the first state and based at least in part on whether an elapsed time since a most recent indication of user input received at a user input device of the controller exceeds a timeout period, that no users are physically proximate to the controller;
   wherein the most recent indication of user input received at the user input device of the controller includes one or more of a physical interaction via a button, a dial, or a touch-sensitive input device; and
   in response to determining that no users are physically proximate to the controller:
      transitioning the controller from the first state to a second state, and
      outputting, by the controller, a second user interface at the display device of the controller, wherein the second user interface comprises second information that is displayed by the display device at a second output size that is larger than the first output size.

2. The method of claim 1, wherein determining that no users are physically proximate to the controller further comprises:
   determining, by the controller, that no users are physically proximate to the controller based at least in part on determining that the elapsed time since the most recent indication of user input received at the user input device of the controller exceeds the timeout period.

3. The method of claim 2, wherein the user input device of the controller comprises one of: a physical control of the controller or a touch-sensitive input device of the controller.

4. The method of claim 1, wherein the first output size comprises a first font size, the second output size comprises a second font size, and
   the second font size is larger than the first font size.

5. The method of claim 1, wherein the first information comprises a primary information and a secondary information associated with the HVAC system, and wherein the second information comprises the primary information and does not comprise the secondary information.

6. The method of claim 5, wherein the first information and the second information comprise one or more of: temperature information, air quality information, energy savings information, water usage information, or security information associated with the building.

7. The method of claim 1, further comprising:
   receiving, at the user input device of the controller while in the second state, an indication of user input; and
   in response to receiving the indication of user input while the controller is in the second state:
      transitioning, by the controller, the controller from the second state to the first state, and
      outputting, by the controller, the first user interface for display at the display device of the controller, wherein the first user interface comprises the first information that is displayed at the first output size by the display device.

8. The method of claim 1, further comprising:
   receiving, at the user input device of the controller while in the second state, an indication of user input; and
   in response to receiving the indication of user input while the controller is in the second state, outputting, by the controller, a third user interface for display at the display device of the controller, wherein the third user interface comprises a user interface for controlling the HVAC system.

9. The method of claim 1, wherein the controller comprises a thermostat for the HVAC system.

10. The method of claim 1, wherein the first state is an active state and the second state is an idle state.

11. A controller device for a heating, ventilation, and air conditioning (HVAC) system in a building, the controller device comprising:
   a display device; and
   processing circuitry configured to:
      output, while the controller device is in a first state, a first user interface for display at the display device, wherein the first user interface comprises first information at a first output size;
      determine, without using a proximity sensor while the controller device is in the first state and based at least in part on whether an elapsed time since a most recent indication of user input received at a user input device of the controller device exceeds a timeout period, that no users are physically proximate to the controller device;
      wherein the most recent indication of user input received at the user input device of the controller includes one or more of a physical interaction via a button, a dial, or a touch-sensitive input device, and
      in response to determining that no users are physically proximate to the controller device:
         transition the controller device from the first state to a second state, and
         output a second user interface at the display device of the controller, wherein the second user interface comprises second information at a second output size that is larger than the first output size.

12. The controller device of claim 11, wherein to determine that no users are physically proximate to the controller, the processing circuitry is further configured to:
   determine that no users are physically proximate to the controller based at least in part on determining that the elapsed time since the most recent indication of user input received at the user input device of the controller exceeds the timeout period.

13. The controller device of claim 12, wherein the user input device of the controller device comprises one of: a physical control of the controller or a touch-sensitive input device of the controller.

14. The controller device of claim 11, wherein the first output size comprises a first font size, the second output size comprises a second font size, and the second font size is larger than the first font size.

15. The controller device of claim 11, wherein the first information comprises a primary information and a secondary information associated with the HVAC system, and wherein the second information comprises the primary information and does not comprise the secondary information.

16. The controller device of claim 15, wherein the first information and the second information comprise one or more of: temperature information, air quality information, energy savings information, water usage information, or security information associated with the building.

17. The controller device of claim 11, wherein the processing circuitry is further configured to:

receive, while in the second state, an indication of user input at the user input device of the controller device; and in response to receiving the indication of user input while the controller device is in the second state:
    transition the controller device from the second state to the first state, and output the first user interface for display at the display device, wherein the first user interface comprises the first information that is displayed at the first output size by the display device.

18. The controller device of claim 11, wherein the processing circuitry is further configured to:

receive, at the user input device of the controller device while in the second state, an indication of user input; and in response to receiving the indication of user input while the controller device is in the second state, output a third user interface for display at the display device of the controller device, wherein the third user interface comprises a user interface for controlling the HVAC system.

19. The controller device of claim 11, wherein the controller device comprises a thermostat for the HVAC system.

20. The controller device of claim 11, wherein the first state is an active state and the second state is an idle state.

* * * * *